(12) United States Patent
Glaum et al.

(10) Patent No.: US 7,614,051 B2
(45) Date of Patent: Nov. 3, 2009

(54) CREATING FILE SYSTEMS WITHIN A FILE IN A STORAGE TECHNOLOGY-ABSTRACTED MANNER

(75) Inventors: Jeffrey D. Glaum, Redmond, WA (US); Andrew M. Rogers, Seattle, WA (US); Mark Scott Tonkelowitz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 669 days.

(21) Appl. No.: 10/837,150

(22) Filed: May 1, 2004

(65) Prior Publication Data

US 2005/0132123 A1 Jun. 16, 2005

Related U.S. Application Data

(60) Provisional application No. 60/530,135, filed on Dec. 16, 2003.

(51) Int. Cl.
  *G06F 9/445* (2006.01)
  *G06F 9/44* (2006.01)
  *G06F 13/00* (2006.01)

(52) U.S. Cl. .............. 717/175; 717/121; 717/177; 711/173

(58) Field of Classification Search .............. None
  See application file for complete search history.

(56) References Cited

U.S. PATENT DOCUMENTS 4,974,149 A 11/1990 Valenti
5,214,695 A 5/1993 Arnold
5,303,384 A 4/1994 Rodriguez
5,325,532 A * 6/1994 Crosswy et al. ............ 713/2
5,421,006 A 5/1995 Jablon
5,625,693 A 4/1997 Rohatgi
5,757,914 A 5/1998 McManis
5,835,777 A 11/1998 Staelin (Continued)

FOREIGN PATENT DOCUMENTS

EP 0802480 10/1997

(Continued)

OTHER PUBLICATIONS

"Constraint-driven system partitioning", Vallejo et al., Dec. 2000, pp. 411-416. Online retrieved at http://delivery.acm.org/10.1145/350000/343811/p411-lopez-vallejo.pdf>.*

(Continued)

*Primary Examiner*—Tuan Q Dam
*Assistant Examiner*—Thuy Dao
(74) *Attorney, Agent, or Firm*—Workman Nydegger

(57) ABSTRACT

Described is a system and method used in manufacturing computer devices, in which a single manufacturing image file contains an internal partition and file system layout into which individual operating system component packages are written. The image file is independent of any particular storage technology. To generate the file, a disk image utility tool inputs a memory configuration file and a package-to-partition mapping file to create the partitions/file systems within the image file. The operating system components (package) are written into the partitions. To store (e.g., flash) the image file's data on a particular storage device, the image file is post-processed to customize the data for a particular storage device.

27 Claims, 10 Drawing Sheets

U.S. PATENT DOCUMENTS

| | | | |
|---|---|---|---|
| 6,108,697 | A | 8/2000 | Raymond et al. |
| 6,157,721 | A | 12/2000 | Shear |
| 6,243,468 | B1 | 6/2001 | Pearce |
| 6,253,300 | B1 | 6/2001 | Lawrence |
| 6,327,652 | B1 | 12/2001 | England |
| 6,330,670 | B1 | 12/2001 | England |
| 6,351,850 | B1 | 2/2002 | Van Gilluwe |
| 6,381,742 | B2 | 4/2002 | Forbes |
| 6,483,746 | B2 | 11/2002 | Haraguchi |
| 6,581,159 | B1 | 6/2003 | Nevis |
| 6,591,376 | B1 | 7/2003 | Vanrooven |
| 6,675,382 | B1 | 1/2004 | Foster |
| 6,681,390 | B2 | 1/2004 | Fiske |
| 6,697,948 | B1 | 2/2004 | Rabin |
| 6,725,205 | B1 | 4/2004 | Weller |
| 6,802,006 | B1 | 10/2004 | Brodov |
| 6,820,130 | B1 | 11/2004 | Miyamoto |
| 6,832,373 | B2 | 12/2004 | O'Neill |
| 6,871,344 | B2 | 3/2005 | Grier |
| 6,912,591 | B2 | 6/2005 | Lash |
| 7,000,230 | B1 | 2/2006 | Murray |
| 7,007,049 | B2 | 2/2006 | Peng |
| 7,072,807 | B2 | 7/2006 | Brown |
| 7,085,957 | B2 | 8/2006 | Sundareson |
| 7,117,304 | B2 * | 10/2006 | Sohn .......................... 711/112 |
| 7,222,341 | B2 | 5/2007 | Forbes |
| 7,228,541 | B2 | 6/2007 | Gupton |
| 7,237,122 | B2 | 6/2007 | Kadam et al. |
| 7,249,174 | B2 | 7/2007 | Srinivasa |
| 7,272,832 | B2 | 9/2007 | Gardner |
| 7,346,435 | B2 | 3/2008 | Amendola |
| 2001/0029605 | A1 | 10/2001 | Forbes |
| 2001/0044782 | A1 | 11/2001 | Hughes |
| 2002/0095672 | A1 * | 7/2002 | Evans et al. .................. 717/175 |
| 2002/0152394 | A1 | 10/2002 | Kadoya |
| 2002/0157010 | A1 | 10/2002 | Dayan |
| 2002/0188940 | A1 | 12/2002 | Breckner |
| 2003/0028766 | A1 | 2/2003 | Gass |
| 2003/0046482 | A1 * | 3/2003 | Venkiteswaran ............ 711/103 |
| 2003/0063896 | A1 | 4/2003 | Gonzales-Tover |
| 2003/0182563 | A1 | 9/2003 | Liu |
| 2003/0192043 | A1 | 10/2003 | Lin |
| 2003/0217358 | A1 | 11/2003 | Thurston |
| 2004/0003266 | A1 | 1/2004 | Moshir |
| 2004/0003388 | A1 * | 1/2004 | Jacquemot et al. .......... 717/174 |
| 2004/0015946 | A1 | 1/2004 | Te'eni |
| 2004/0015958 | A1 | 1/2004 | Veil |
| 2004/0060035 | A1 | 3/2004 | Ustaris |
| 2004/0250245 | A1 | 12/2004 | Rao |
| 2004/0255291 | A1 | 12/2004 | Sierer |
| 2005/0132179 | A1 | 6/2005 | Glaum |
| 2005/0132349 | A1 | 6/2005 | Roberts et al. |
| 2005/0132350 | A1 | 6/2005 | Markley |
| 2005/0132356 | A1 | 6/2005 | Cross |
| 2005/0155031 | A1 | 7/2005 | Wang |
| 2005/0203968 | A1 | 9/2005 | Dehghan |
| 2006/0079254 | A1 | 4/2006 | Hogan |

FOREIGN PATENT DOCUMENTS

| | | |
|---|---|---|
| EP | 0936548 | 8/1999 |
| EP | 1164475 | 12/2001 |
| EP | 1227399 | 7/2002 |
| EP | 1280058 | 1/2003 |
| EP | 1351137 | 10/2003 |
| WO | WO99/26123 | 5/1999 |
| WO | 01-52065 | 7/2001 |
| WO | WO0201332 | 1/2002 |
| WO | WO02103495 | 12/2002 |

OTHER PUBLICATIONS

"Hardware/software partitioning of embedded system in OCAPI-xl", Vanmeerbeeck et al., Dec. 2001, pp. 30-31. Online retrieved at <http://delivery.acm.org/10.1145/380000/371665/p30-vanmeerbeeck.pdf>.*

"Brief Announcement: Assignment-based partitioning in a condition monitoring system", Huang et al., Dec. 2002, p. 333. Online retrieved at <http://delivery.acm.org/10.1145/580000/571849/p133-huang.pdf>.*

European Search Report in application EP 04029342 which corresponds to US Application.

Lymn, Brett; "Preventing the Unauthorised Binary" article, Copyright 2000-2002, Jan. 19, 2000 Updated Jun. 18, 2002 by Jay Fink.

Anonymous: "Method for Generating Ordered build Dependencies" IBM Technical Disclosure Bulletin, vol. 38, No. 9, Sep. 1, 1995, pp. 161-162.

Ottenstien et al., "The Program Dependence Graph in a Software Development Environment", ACM 1984 p. 177-184.

Mark Alan Weiss, "Data Structures & Algorithim Analysis in C++" Second Edition, Published by Addison Wesley, 1999, pp. 339-346, Section 9.3.2 Dijkstra's Algorithim.

Office Action dated Nov. 14, 2007 cited in related U.S. Appl. No. 10/837,176.

Office Action dated Nov. 28, 2007 cited in related U.S. Appl. No. 10/837,024.

U.S. Appl. No. 10/387,151, filed May 1, 2004, Shell.

Office Action dated Jun. 29, 2007 cited in related U.S. Appl. No. 10/387,250.

Advisory Action dated Feb. 20, 2008 cited in related U.S. Appl. No. 10/837,176.

Notice of Allowance dated Apr. 18, 2008 cited in related U.S. Appl. No. 10/837,024.

Office Action dated Dec. 12, 2007 cited in related U.S. Appl. No. 10/837,250.

Advisory Action dated Mar. 3, 2008 cited in related U.S. Appl. No. 10/837,250.

Office Action dated May 21, 2008 cited in related U.S. Appl. No. 10/837,250.

Office Action dated Jun. 9, 2008 cited in related U.S. Appl. No. 10/837,176.

Office Action dated Jun. 25, 2007 cited in related U.S. Appl. No. 10/837,024.

Office Action dated Aug. 21, 2006 cited in related U.S. Appl. No. 10/837,250.

Office Action dated Jun. 23, 2006 cited in related U.S. Appl. No. 10/837,151.

Office Action dated Dec. 9, 2008 cited in U.S. Appl. No. 10/837,151.
Office Action dated Jan. 2, 2009 cited in U.S. Appl. No. 10/837,176.
Office Action dated Jan. 7, 2009 cited in U.S. Appl. No. 10/837,250.
Notice of Allowance dated Mar. 31, 2009 cited in U.S. Appl. No. 10/837,250.
Office Action dated Feb. 27, 2009 cited in U.S. Appl. No. 10/837,151.

* cited by examiner

CREATING FILE SYSTEMS WITHIN A FILE IN A STORAGE TECHNOLOGY-ABSTRACTED MANNER

CROSS-REFERENCE TO RELATED APPLICATIONS

The present invention claims priority to U.S. provisional patent application Ser. No. 60/530,135 filed Dec. 16, 2003, and incorporated herein in its entirety.

The present invention is related to the following United States patent applications, filed concurrently herewith and incorporated herein in their entireties:

Ser. No. 10/837,250, "Applying Custom Software Image Updates To Non-Volatile Storage in a Failsafe Manner;"

Ser. No. 10/837,136, "Determining the Maximal Set f Dependent Software Updates Valid for Installation;"

Ser. No. 10/837,151, "Ensuring that a Software Update may be Installed or Run only on a Specific Device or Class of Devices" and Ser. No. 10/837,024, "Self-Describing Software Image Update Components."

FIELD OF THE INVENTION

The invention relates generally to computing devices such as those having embedded operating systems, and more particularly to configuring the non-volatile storage of computing devices.

BACKGROUND

Mobile computing devices such as personal digital assistants, contemporary mobile telephones, and hand-held and pocket-sized computers are becoming important and popular user tools. In general, they have become small enough to be extremely convenient, while consuming less battery power, and at the same time have become capable of running more powerful applications.

During the process of manufacturing such devices, embedded operating system images are typically built into a monolithic image file and stored in non-volatile storage (e.g., NAND or NOR flash memory, a hard disk, or the like) of each device. As a result, the monolithic image file has to be pre-configured from the various parts that make up an operating system. Further, updating such a device is necessary or desirable from time-to-time, and requires making changes to the operating system.

However, there are a number of disadvantages when dealing with a monolithic image, including that to install any update, the entire image (or possibly some predefined subset thereof) needs to be replaced, which requires a large amount of resources including temporary storage and bandwidth. Monolithic replacements have heretofore been used for updating such devices, because updating separate components of the operating system is a difficult task, due to various conflicts and dependencies. Further, any such componentization leads to another problem, in that an initial image is still needed for manufacturing, but initial images heretofore were essentially just monolithic groups of bits transferred to devices. What is needed is a mechanism for converting operating system image components into a file system-based manufacturing image that is suitable for use as an initial image, yet is designed to facilitate componentized updating of the device.

SUMMARY OF THE INVENTION

Briefly, the present invention provides a method and system generally directed towards creating a single manufacturing image file that contains a partition and file system layout, into which individual operating system component packages are installed at build time. The process is done in a storage technology-abstract way such that the system and method do not care about the type of underlying storage (e.g., flash), and/or any requirements that the underlying storage may impose on the layout of the image. Rather, in a separate step, the resultant image file is post-processed, including customizing the image file for the actual type of storage device that exists.

In one implementation, various types of partitions are created within a file, each partition corresponding to a file system. A collection of operating system image components (called packages) are converted into partitions of the file system-based manufacturing image. From that file, an initial operating system image may be established on the device during the manufacturing process, in a manner such that image update technology can later make use of a like partition and file system model on the device.

To convert the various packages to the initial manufacturing image, the single manufacturing image file is created in which the image is arranged in a partition and file system layout. This file is then post-processed as necessary to add metadata as needed for installing its contents at manufacturing time.

To build the file, which is the file to be ultimately written to the virtual flash, various partitions are created. Note that some of the total flash may be reserved by the device manufacturer for various purposes, leaving the remaining memory available as virtual memory for use by the operating system components and an optional user store. Each partition has a certain purpose, and may be considered as its own file system. For example, there may be binary partitions, such as for an update loader, and a RAMIMAGE/ROMIMAGE partition for a kernel (NK) partition. An Image Update File System (IMGFS) partition may contain the operating system files, and user store partition may be specified for user data storage. A master boot record is created in the file to designate the partitions. Additional data can be included in the file.

In one implementation, a disk image utility creates the file, and an image post-processor adds metadata to prepare the file for writing to a desired storage medium. The disk image utility is responsible for taking the operating system packages, and, based on a memory description (a memory configuration file) of how the partitions are to be laid out in storage along with a description (a partition mapping file) of how the packages should be mapped into that partition structure, produces the output file that contains the various partitions with the contents of each package stored in an appropriate partition. Further, any executable code is fixed up to the appropriate virtual address space-based address. The memory configuration file provides the operating system run-time virtual address space memory map for both non-volatile storage and system RAM. The partition mapping file contains a list of uniquely identified packages, and is used for mapping a package into a specified partition.

The post-processor acts upon the output file to introduce any modifications to the partition and file system layout as required by a specific storage technology. For example, adjustments may need to be made to handle the different ways in which different flash parts manage sector-level information in flash.

Other advantages will become apparent from the following detailed description when taken in conjunction with the drawings, in which:

DETAILED DESCRIPTION

Exemplary Operating Environment

Figure 1:
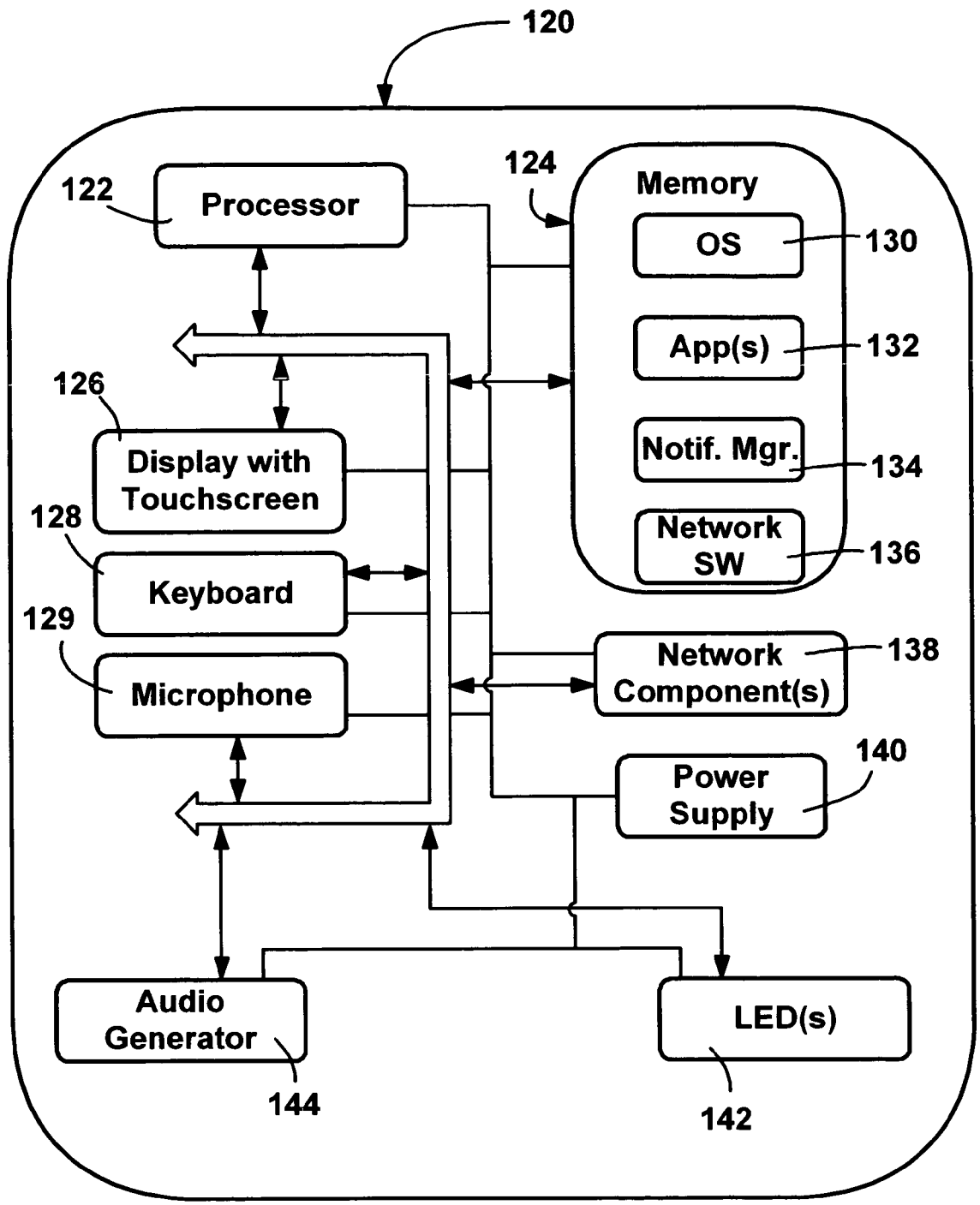
FIG. 1 is a block diagram generally representing a computer system into which the present invention may be incorporated.

FIG. 1 shows functional components of one such handheld computing device 120, including a processor 122, a memory 124, a display 126, and a keyboard 128 (which may be a physical or virtual keyboard, or may represent both). A microphone 129 may be present to receive audio input. The memory 124 generally includes both volatile memory (e.g., RAM) and non-volatile memory (e.g., ROM, PCMCIA cards, and so forth). An operating system 130 is resident in the memory 124 and executes on the processor 122, such as the Windows® operating system from Microsoft Corporation, or another operating system.

One or more application programs 132 are loaded into memory 124 and run on the operating system 130. Examples of applications include email programs, scheduling programs, PIM (personal information management) programs, word processing programs, spreadsheet programs, Internet browser programs, and so forth. The handheld personal computer 120 may also include a notification manager 134 loaded in the memory 124, which executes on the processor 122. The notification manager 134 handles notification requests, e.g., from the application programs 132. Also, as described below, the handheld personal computer 120 includes networking software 136 (e.g., hardware drivers and the like) and network components 138 (e.g., a radio and antenna) suitable for connecting the handheld personal computer 120 to a network, which may include making a telephone call.

The handheld personal computer 120 has a power supply 140, which is implemented as one or more batteries. The power supply 140 may further include an external power source that overrides or recharges the built-in batteries, such as an AC adapter or a powered docking cradle.

The exemplary handheld personal computer 120 represented in FIG. 1 is shown with three types of external notification mechanisms: one or more light emitting diodes (LEDs) 142 and an audio generator 144. These devices may be directly coupled to the power supply 140 so that when activated, they remain on for a duration dictated by a notification mechanism even though the handheld personal computer processor 122 and other components might shut down to conserve battery power. The LED 142 preferably remains on indefinitely until the user takes action. Note that contemporary versions of the audio generator 144 use too much power for today's handheld personal computer batteries, and so it is configured to turn off when the rest of the system does or at some finite duration after activation.

Note that although a basic handheld personal computer has been shown, virtually any device capable of receiving data communications and processing the data in some way for use by a program, such as a mobile telephone, is equivalent for purposes of implementing the present invention.

Creating File Systems within a File

The present invention is generally directed towards installing and/or updating software that is stored on small mobile computing devices, such as Microsoft Windows® CE .NET-based portable devices, including those in which the initial software or software update is written to an embedded device's non-volatile memory, e.g., flash memory. Notwithstanding, the present invention provides benefits to computing in general, and thus may apply to other computing devices and other types of storage, including various types of memory and/or other types of storage media such as hard disk drives. For purposes of simplicity, the term "flash" hereinafter may be used with reference to the updatable storage of a device, although it is understood that any storage mechanism is equivalent. Further, the term "image" will generally include the concept of the initial software installation image as well as subsequent software updates to an image, even when only part of an existing image is updated.

Images containing both executable code and data may be applied to storage. The executable code is customized to the virtual address space environment of the embedded device at install time. In keeping with an aspect of the present invention, image update technology in general breaks the operating system image into updateable components that can be updated in isolation, while maintaining any cross-component dependencies. As will be understood, the initial image is arranged in a manner that facilitates initial installation to a device, as well as subsequent updates thereto.

In accordance with an aspect of the present invention, there is provided a system and method that converts a collection of operating system image components (called packages) into a file system-based manufacturing image. This is done via a partition and file system model, such that an output file is created. From that file, an initial operating system image may be established on the device during the manufacturing process, in a manner such that image update technology can later make use of a like partition and file system model on the device. This facilitates secure and failsafe updates to individual components, to entire partitions, or to the entire image if necessary.

To convert the various packages to the initial manufacturing image, there is provided a method and system generally directed towards creating the single manufacturing image file, which in turn contains the image arranged in a partition and file system layout. This file is then post-processed as necessary to prepare its contents for installation at build time. Thus, it is into this manufacturing file that the individual operating system component packages are written. The overall file construction process is done in a storage (e.g., flash) technology-abstract way such that the system and method do not care about the type of underlying storage, and/or any requirements that the underlying storage may impose on the layout of the image. Rather, in a separate step, the resultant image file is post-processed, including customizing the image file for the actual type of storage device that exists, so that the initial image can then be applied to any device as desired.

Figure 2:
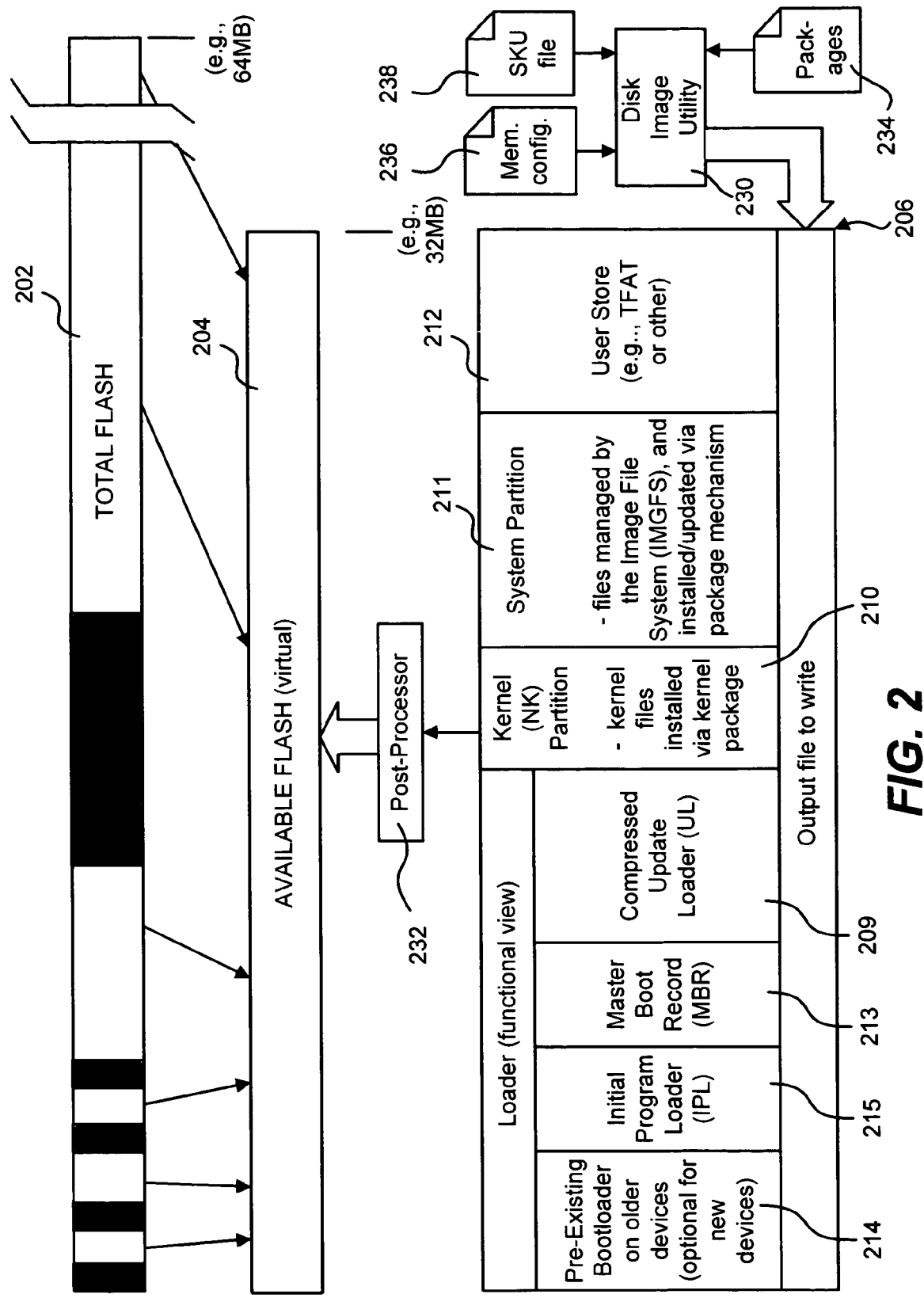
FIG. 2 is a block diagram representing an output file built with distinct partitions therein for maintaining data for writing as an image to an embedded device or other medium, in accordance with an aspect of the present invention.

FIG. 2 provides an example of a device's storage (e.g., flash) into which a manufacturing image will be laid out in a manner facilitated by various aspects of the present invention, as described below. In FIG. 2, some of the total flash 202 (e.g., 32 megabytes of a total 64 megabytes) is reserved by the device manufacturer for various purposes, (e.g., for code related to the device's radio). The remainder (e.g., 32 megabytes) is flash memory available as virtual memory 204 for use by the operating system and (optionally) a user store. As described below, the file will take the reserved sections into account.

In accordance with an aspect of the present invention and as described below, various partitions are created in a file 206, which is the file to be written to the virtual flash 204. Each partition has a certain purpose, and is (or may be considered) as containing its own file system. For example, in the embodiment of FIG. 2, there is a partition 209 for an update loader, a kernel (NK) partition 210, a system partition 211 and a user store partition 212 (e.g., formatted for user data storage). A master boot record (MBR) 213 is created in the file to designate the partitions, as described below. Further, as represented in FIG. 2 for purposes of completeness, additional data can be included in the file 206, e.g., by pre-pending data thereto, such as a pre-existing bootloader 214 (for older devices, although optional for new devices), and an initial program loader (IPL) 215. As can be readily appreciated, some or all of this additional data can be flashed into a device independent of the other partitions, whereby the file 206 would be flashed to the remaining virtual flash, however including these bits in the manufacturing file 206 eliminates such an additional manufacturing step. Note that the partitions in FIG. 2 are not intended to be shown to scale, and further that the amount of total memory and/or available memory are only examples.

As will be understood, the present invention provides the ability to create a manufacturing image using standard file system concepts in a single file and in a storage-abstracted way. As a result, embedded and other solutions may be adapted to any new storage technologies as they become available, in a straightforward manner and with little/no impact to the core procedure. For example, through post-processing, a flash file system image can be adapted to become a hard-disk image.

In addition, being able to create file systems within an individual file at build time means that complex partitioning, formatting, and other file system logic need not be implemented in a manufacturing-time environment. Instead, the standard means by which images are written to storage today (e.g., flash gang programmers, JTAG, or byte stream copies) will still work, even though underlying the image is a potentially complex partition and file system-based scheme that later may be used by the operating system image at runtime.

To accomplish various aspects of the present invention, in one example implementation (generally described above with reference to FIG. 2), two primary components are provided, namely a disk image utility 230 and an image post-processor 232. The disk image utility 230 is responsible for taking a collection of packaged operating system components (or packages) 234, along with a description (file 236) of how the user (e.g., the manufacturer) would like the partitions/file systems to be laid out in storage, and a description (file 238, also referred to as a package-to-partition mapping file and/or an image manifest file) of how the packages 234 should be mapped into that partition structure. From this information, the disk image utility 230 generates the single output file 206 that contains the various partitions 209-212, with the contents of each package stored in an appropriate partition, and with the executable code being fixed up to the appropriate virtual address space-based address.

Once in this output file state, a post-processor 232 acts upon this output file to introduce any modifications to the partition and file system layout as required by a specific storage technology. For example, adjustments may need to be made to handle the different ways in which different flash parts manage sector-level information in flash, as generally described below with respect to post-processing.

In the example implementation in FIG. 2, the disk image utility 230 is thus driven by the two input files 236 and 238, that is, the memory configuration file 236 (e.g., memory.cfg.xml) and the package-to-partition mapping file 238 (e.g., *.sku.xml, where * represents a valid filename). In general, the partition mapping file 238 contains information that maps each specific operating system component (e.g., a package) to a specific partition denoted in the memory configuration file 236.

The partitions 209-212 may be (and ordinarily are) of different types. For example, in one implementation, there may be a BINARY partition (a BINARY partition has bits simply copied as is thereto) such as the compressed update loader partition 209; one or more RAMIMAGE or ROMIMAGE partitions such as the NK partition 210; one or more IMGFS (Image Update File System) partitions such as the system partition 211; and/or USERSTORE partitions such as the TFAT or other partition 212. Although there may be any total number to partitions and/or types of partitions, one current implementation limits the total number to four for purposes of keeping the mechanism simple to configure, e.g., an update loader (BINARY), NK partition (RAMIMAGE or ROMIMAGE), system partition (IMGFS) and user partition (USERSTORE) as represented in FIG. 2. Note that even with such an arbitrary limit, there may be a repeated type, e.g., with a limit of four partitions, three binary types and one IMGFS would be acceptable, and further that other type of partitions are feasible.

The memory configuration file 236 denotes the operating system run-time virtual address space memory map for both non-volatile storage and system RAM. The data denotes how the user of the utility would like to make use of the specified storage resources, by specifying one or more partitions into which information can be stored, and assigning characteristics to the data that is to be stored in a partition.

In one implementation, the memory configuration file 236 is an XML-formatted file which is validated against the following XSD:

```xml
<?xml version="1.0" encoding="utf-8" ?>
<xs:schema targetNamespace="http://tempuri.org/MemoryCFG.xsd"
elementFormDefault="qualified"
    xmlns="http://tempuri.org/MemoryCFG.xsd"
xmlns:mstns="http://tempuri.org/MemoryCFG.xsd"
    xmlns:xs="http://www.w3.org/2001/XMLSchema">
    <xs:element name="MEMORYCFG">
        <xs:complexType>
            <xs:sequence>
                <xs:element name="HARDWARE">
                    <xs:complexType>
                        <xs:sequence>
                            <xs:element name="RAM">
                                <xs:complexType>
                                    <xs:sequence>
                                        <xs:element name="RAM_RESERVE" minOccurs="0" maxOccurs="unbounded">
                                            <xs:complexType>
                                                <xs:sequence></xs:sequence>
                                                <xs:attribute name="START" type="xs:string" use="required" />
                                                <xs:attribute name="LENGTH" type="xs:string" use="required" />
                                                <xs:attribute name="ID" type="xs:string" use="required" />
                                            </xs:complexType>
                                        </xs:element>
                                    </xs:sequence>
                                    <xs:attribute name="START" type="xs:string" use="required" />
                                    <xs:attribute name="LENGTH" type="xs:string" use="required" />
                                </xs:complexType>
                            </xs:element>
                            <xs:element name="NOR" minOccurs="0" maxOccurs="unbounded">
                                <xs:complexType>
                                    <xs:sequence>
                                        <xs:element name="NOR_RESERVE" minOccurs="0" maxOccurs="unbounded">
                                            <xs:complexType>
                                                <xs:sequence />
                                                <xs:attribute name="VASTART" type="xs:string" use="required" />
                                                <xs:attribute name="LENGTH" type="xs:string" use="required" />
                                                <xs:attribute name="ID" type="xs:string" use="required" />
                                            </xs:complexType>
                                        </xs:element>
                                    </xs:sequence>
                                    <xs:attribute name="VASTART" type="xs:string" use="required" />
                                    <xs:attribute name="SECTORSIZE" type="xs:string" use="required" />
                                    <xs:attribute name="BLOCKSIZE" type="xs:string" use="required" />
                                    <xs:attribute name="LENGTH" type="xs:string" use="required" />
                                    <xs:attribute name="ID" type="xs:string" use="required" />
                                </xs:complexType>
                            </xs:element>
                            <xs:element name="NAND" minOccurs="0" maxOccurs="unbounded">
                                <xs:complexType>
                                    <xs:sequence>
                                        <xs:element name="NAND_RESERVE" maxOccurs="1" minOccurs="0">
                                            <xs:complexType>
                                                <xs:sequence />
                                                <xs:attribute name="LENGTH" type="xs:string" use="required" />
                                                <xs:attribute name="ID" type="xs:string" use="required" />
                                            </xs:complexType>
                                        </xs:element>
                                    </xs:sequence>
                                    <xs:attribute name="SECTORSIZE" type="xs:string" use="required" />
                                    <xs:attribute name="BLOCKSIZE" type="xs:string" use="required" />
                                    <xs:attribute name="LENGTH" type="xs:string" use="required" />
                                    <xs:attribute name="ID" type="xs:string" use="required" />
                                </xs:complexType>
                            </xs:element>
                        </xs:sequence>
                    </xs:complexType>
                </xs:element>
                <xs:element name="PARTITIONS">
                    <xs:complexType>
                        <xs:sequence>
                            <xs:element name="BINARY" minOccurs="0" maxOccurs="unbounded">
                                <xs:complexType>
                                    <xs:sequence></xs:sequence>
                                    <xs:attribute name="STORAGE_ID" type="xs:string" use="required" />
                                    <xs:attribute name="DATAFILE" type="xs:string" use="required" />
                                    <xs:attribute name="ID" type="xs:string" use="required" />
                                    <xs:attribute name="COMPRESS" type="xs:boolean" />
                                </xs:complexType>
                            </xs:element>
                            <xs:element name="RAMIMAGE" minOccurs="0" maxOccurs="1">
                                <xs:complexType>
                                    <xs:sequence />
                                    <xs:attribute name="STORAGE_ID" type="xs:string" use="required" />
                                    <xs:attribute name="FREE_SPACE_BUFFER" type="xs:string" />
                                    <xs:attribute name="FIXUP_ADDRESS" type="xs:string" use="required" />
                                    <xs:attribute name="COMPRESS" type="xs:boolean" />
                                    <xs:attribute name="LENGTH" type="xs:string" />
                                    <xs:attribute name="ID" type="xs:string" use="required" />
                                    <xs:attribute name="FSRAMPERCENT" type="xs:string" use="required" />
                                    <xs:attribute name="ROMFLAGS" type="xs:string" use="required" />
                                </xs:complexType>
                            </xs:element>
                            <xs:element name="ROMIMAGE" minOccurs="0" maxOccurs="1">
                                <xs:complexType>
                                    <xs:sequence />
                                    <xs:attribute name="FREE_SPACE_BUFFER" type="xs:string" />
                                    <xs:attribute name="STORAGE_ID" type="xs:string" use="required" />
                                    <xs:attribute name="LENGTH" type="xs:string" />
                                    <xs:attribute name="ID" type="xs:string" use="required" />
                                    <xs:attribute name="FSRAMPERCENT"
```

-continued

```
type="xs:string" use="required" />
            <xs:attribute name="ROMFLAGS"
type="xs:string" use="required" />
          </xs:complexType>
        </xs:element>
        <xs:element name="IMGFS" maxOccurs="1"
minOccurs="0">
          <xs:complexType>
            <xs:sequence />
            <xs:attribute name="FREE_SPACE_BUFFER"
type="xs:string" />
            <xs:attribute name="STORAGE_ID"
type="xs:string" use="required" />
            <xs:attribute name="LENGTH"
type="xs:string" />
            <xs:attribute name="ID" type="xs:string"
use="required" />
          </xs:complexType>
        </xs:element>
        <xs:element name="USERSTORE" minOccurs="0"
maxOccurs="unbounded">
          <xs:complexType>
            <xs:sequence></xs:sequence>
            <xs:attribute name="STORAGE_ID"
type="xs:string" use="required" />
            <xs:attribute name="ID" type="xs:string"
use="required" />
            <xs:attribute name="PART_TYPE"
type="xs:string" use="required" />
          </xs:complexType>
        </xs:element>
      </xs:sequence>
    </xs:complexType>
  </xs:element>
</xs:schema>
```

An example memory configuration is set forth below:

As can be seen from this example, the hardware section of the memory configuration file provides a full description of the location of RAM and of each flash part that is reserved, and also for each flash part that is to be managed as storage by the disk image utility. NOR and NAND tags are used generically to refer to linear (RAM-like) or block-based storage, respectively. Each storage part is provided with a unique identifier/name. The partition section denotes how the specified storage parts should be used in a partition-based abstraction.

ROMIMAGE, for example, means the contents of the partition should be fixed-up/relocated (as described below) to actually execute from the storage part, (execute in place, or XIP), which is a characteristic of linear-type storage devices. Note that if ROMIMAGE is used, the diskimage utility ensures that any execute in place code is not compressed, and further, that individual code sections of modules are contiguous in physical space, that is, such code sections of execute-in-place code will not span a reserved region. A RAMIMAGE tag would indicate that the contents should be fixed-up/relocated to run out of RAM (on the assumption that a loader would move the code from storage to RAM at the appropriate time). In addition to image storage, additional partition types can be denoted; in the example above, a user-store is defined as a partition for data storage.

The partition mapping file (or SKU) 238, contains a list of uniquely identified packages, and is used for mapping a package into a specified partition. The partition mapping file is an XML file that is validated against the following XSD:

```
<?xml version="1.0" encoding="utf-8" ?>
<MEMORYCFG xmlns="http://tempuri.org/MemoryCFG.xsd">
  <HARDWARE>
    <RAM START="0x840A0000" LENGTH="0x00F48000"></RAM>
    <NOR VASTART="0x80000000" SECTORSIZE="0x200" BLOCKSIZE="0x20000"
LENGTH="0x3800000" ID="AR11FLASH">
      <NOR_RESERVE VASTART="0x80000000" LENGTH="0x80000"
ID="GSM1"></NOR_RESERVE>
      <NOR_RESERVE VASTART="0x80080000" LENGTH="0x20000"
ID="IPL"></NOR_RESERVE>
      <NOR_RESERVE VASTART="0x80100000" LENGTH="0x80000"
ID="GSM2"></NOR_RESERVE>
      <NOR_RESERVE VASTART="0x80200000" LENGTH="0x80000"
ID="GSM3"></NOR_RESERVE>
      <NOR_RESERVE VASTART="0x80300000" LENGTH="0x80000"
ID="GSM4"></NOR_RESERVE>
      <NOR_RESERVE VASTART="0x80800000" LENGTH="0x1800000"
ID="BIGRESRV"></NOR_RESERVE>
      <NOR_RESERVE VASTART="0x82000000" LENGTH="0x0040000"
ID="EBOOT"></NOR_RESERVE>
    </NOR>
  </HARDWARE>
  <PARTITIONS>
    <BINARY STORAGE_ID="AR11FLASH" ID="ULDR" DATAFILE="uldr.nb0" />
    <ROMIMAGE STORAGE_ID="AR11FLASH" ID="NK" FSRAMPERCENT="0x40"
ROMFLAGS="2" FREE_SPACE_BUFFER="0x10000" />
    <IMGFS STORAGE_ID="AR11FLASH" ID="OS" />
    <USERSTORE STORAGE_ID="AR11FLASH" ID="Storage" PART_TYPE="0x04" />
  </PARTITIONS>
</MEMORYCFG>
```

```
<?xml version="1.0" encoding="utf-8" ?>
- <xs:schema id="SKUFile" targetNamespace="http://tempuri.org/SKUFile.xsd"
elementFormDefault="qualified" xmlns="http://tempuri.org/SKUFile.xsd"
xmlns:mstns="http://tempuri.org/SKUFile.xsd"
xmlns:xs="http://www.w3.org/2001/XMLSchema">
    - <xs:element name="SKU">
        - <xs:complexType>
            - <xs:sequence>
                - <xs:element name="PACKAGE_LIST" maxOccurs="unbounded" minOccurs="0">
                    - <xs:complexType>
                        - <xs:sequence>
                            - <xs:element name="PACKAGE_FILE" maxOccurs="unbounded" minOccurs="0">
                                - <xs:complexType mixed="true">
                                    <xs:sequence />
                                    <xs:attribute name="COMPRESSION" type="xs:string" />
                                </xs:complexType>
                              </xs:element>
                          </xs:sequence>
                        <xs:attribute name="PARTITION_ID" type="xs:string" use="required" />
                        <xs:attribute name="COMPRESSION" type="xs:string" />
                    </xs:complexType>
                </xs:element>
                <xs:element name="RESERVE_PACKAGE" type="xs:string" maxOccurs="unbounded" minOccurs="0" />
            </xs:sequence>
            <xs:attribute name="DEFAULT_COMPRESSION" type="xs:string" />
        </xs:complexType>
    </xs:element>
</xs:schema>
```

An example partition mapping (SKU) file 238 would look like the XML-formatted data below:

```
<?xml version="1.0" encoding="utf-8" ?>
<SKU xmlns="http://tempuri.org/SKUFile.xsd">
    <PACKAGE_LIST PARTITION_ID="NK">
        <PACKAGE_FILE>oem</PACKAGE_FILE>
    </PACKAGE_LIST>
    <PACKAGE_LIST PARTITION_ID="OS">
        <PACKAGE_FILE>lang</PACKAGE _FILE>
    </PACKAGE_LIST>
</SKU>
```

In this particular example, an example package file ("oem") is mapped to a partition named "NK" which in the memory configuration file 236 above is defined as being a ROMIMAGE partition having code fixed-up/relocated to execute-in-place on the flash itself, as opposed to in RAM. As can also be seen from this example, the specified partition is present on the single NOR flash part noted in the hardware section, which is at virtual address 0x8000.0000 and is 0x380.0000 bytes long. As also seen in this example, a package named "lang" is mapped to a second partition referred to as "OS" which is in the IMGFS partition (a partition managed by a file system driver called "IMGFS"), and also resides on the single NOR part specified in the hardware section (but not overlapping with the previous NK partition).

Based on the configuration information provided in the two input files 236 and 238, the disk image utility 230 processes the contents of the noted package. Each executable located in a given package is appropriately located to a unique virtual address space range through a fix-up or relocation process. Depending on whether the partition contents are meant to be run out of RAM or execute in place in flash, the disk image utility 230 uses the address space information along with known restrictions (e.g., based on CPU architecture and so forth) as to where subsections of an executable file can be placed in the overall virtual address space, to process each executable file and locate the contents at a non-overlapping virtual address space range.

Figure 3:
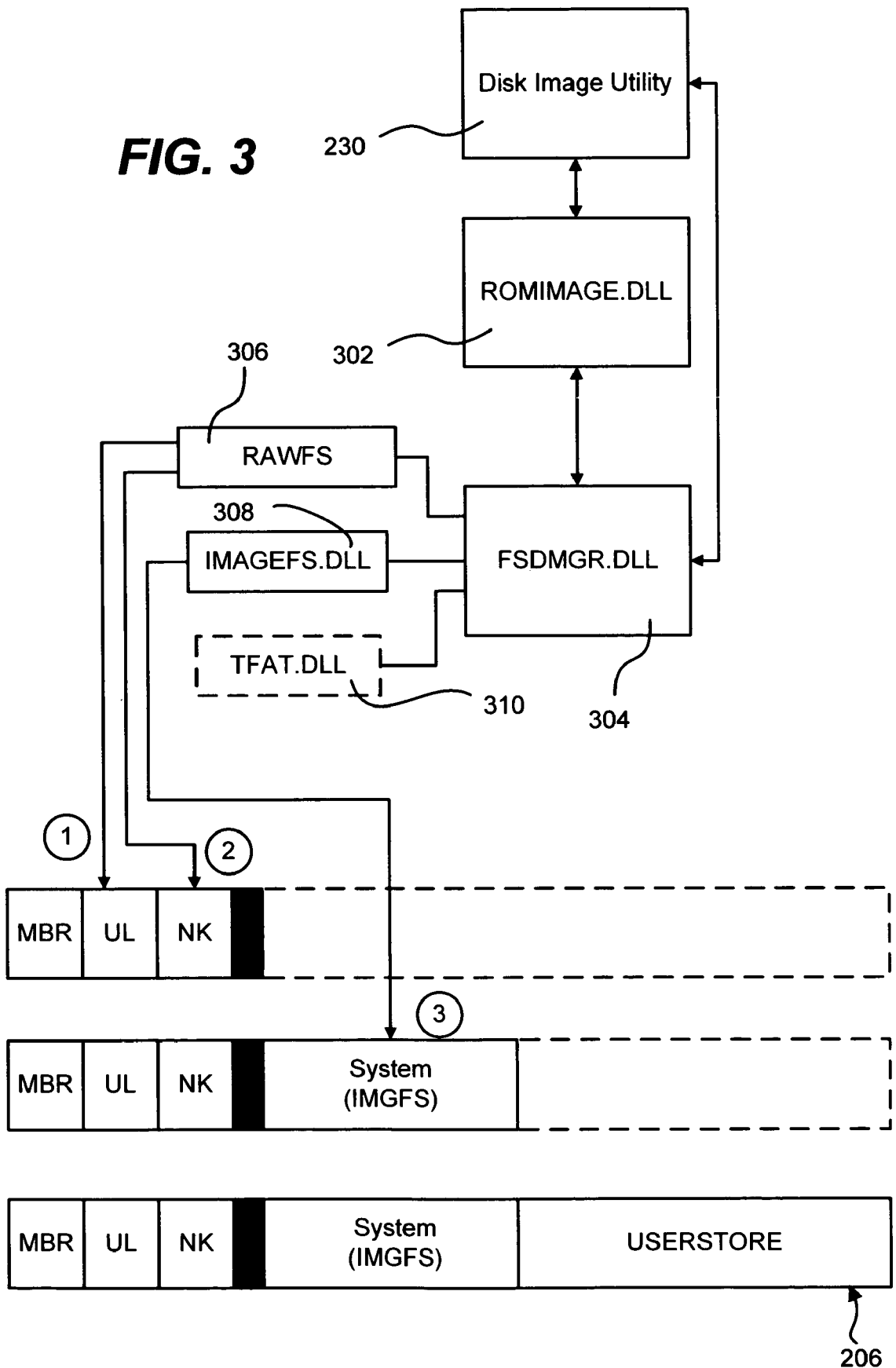
FIG. 3 is a block diagram representing various components used to configure the output file, in accordance with an aspect of the present invention.

As generally represented in FIG. 3, the fix-up process is handled by a component (e.g., linked to or within the disk image utility 230 or otherwise associated therewith) called Romimage 302. In the example implementation, Romimage 302 is a DLL (dynamic link library), which is also used on the device during the package installation process to fix-up/relocate code at install time on the device. While being built, the resultant file 206 is stored into an appropriate partition within a file stored on the desktop computer building the file, using the same file system code as is used on the device at run-time. Note that the code is build-able for the device as well as for the host build system to minimize incompatibility problems.

Before building the file, the disk image utility 230 requests creation a file of a certain size, e.g., 64 megabytes in size. After the FSDMGR 304 creates the file, the disk image utility 230 processes the memory configuration file 236, to have the FSDMGR 304 mark off the reserved sections, so that they are left intact. The remaining memory, e.g., 32 MB, is now available via the FSDMGR 304. At this time, the file is ready to be built with the needed partitions.

As can be seen from the example memory configuration file above, a BINARY partition is desired. More particularly, FIG. 3 shows an example of how the diskimage utility 230 works with the romimage.dll functions and the file system device driver manager 304 (FSDMGR.DLL) to build the file 206. In order to create partitions in the file, the diskimage utility 230 works in conjunction with the FSDMGR 304 to create a master boot record (because one is not yet present). Data is added to the master boot record to indicate that a BINARY partition follows, that is, the data creates the partition. In this implementation, no size is specified, and thus for now, the entire size of the remaining flash is used for this BINARY partition.

In this example, the disk image utility 230 will request, via the Romimage 302, that FSDMGR 304 write the update loader to the BINARY partition, as generally represented in FIG. 3 via the arrow labeled with circled numeral one (1). As described in the aforementioned related patent application entitled "Applying Custom Software Image Updates To Non-Volatile Storage in a Failsafe Manner," an update loader is essentially a special section of operating system code to which a device boots (instead of the normal operating system code) when a device is being updated. Because the update loader is a binary blob of bits from the perspective of the disk image utility, the partition is mounted and FSDMGR 304 uses a rawFS dll 306 to write the binary bits to the BINARY partition 209 (into the space following the master boot record 213).

Once written, the actual amount of data that was written is then obtained by calling into the FSDMGR 304. In an automatic sizing operation, the new offset for the start of the next partition is based on this actual size, whereby the update loader partition 209 essentially only consumes the amount of space in the file that it needs.

The disk image utility 230 again calls to creaks the NK partition in the file (that is, by writing data to the master boot record 213) in a similar manner, and the NK partition is then written to by calling romimage.dll with a request to write data to the NK partition. Note that the parameters sent from the disk image utility 230 for building the NK partition needed by romimage.dll include the list of files to build, and allocators for allocating flash space and virtual address space, described below. The Romimage.dll 302 will fix up this data into a set of bits, and then provide them to the FSDMGR 304, which will then write the NK. partition via the rawFS dll 306, as represented in FIG. 3 by the arrow labeled with circled numeral two (2). Note that physical fixups, as well as virtual fixups, may be needed, e.g., for any execute in place code.

Again, no size was specified, so the entire remaining space is used for this NK partition until resized. In this example, however, instead of moving the offset back from the end of the file based on the exact size written for the NK partition, some amount additional space (a buffer) following the NK bits may be left in the NK partition, as represented by the shaded area in FIG. 3. This free space buffer is specified in the memory XML file and essentially moves the offset slightly ahead of the amount of actual bytes written, and thereby enables future updates to the NK partition to consume more space than consumed by the current NK partition, that is, to allow for growth in subsequent updates.

As represented in FIG. 3 by the arrow labeled with circled numeral three (3), via romimage.dll, the IMGFS partition is next created (again extending to the end of the file) and written. Note that this time, this is an IMGFS partition, not a binary one, as recognized by the FSDMGR 304. Thus an imgfs.dll 308 is used for writing to the system partition, because this is the driver that handles that particular partition in runtime on a device. Further, note that any physical fixups are abstracted via the imgfs.dll 308, and thus for the system partition, the romimage process 302 only performs virtual address fixups as specified. Automatic resizing is then performed as described above, to move the offset for the next partition to the amount of data written (plus any desired free space buffer, although no free space buffer is present in the current example).

The next partition is a USERSTORE, which can be any type of partition, in this example a partition of type 4. The USERSTORE partition is created by writing to the master boot record, and extends to the end of the file. Note however that no data is written at this time, and thus this partition is not mounted. When the user later wishes to access this partition, the FSDMGR will do so through an appropriate driver, e.g., the TFAT.dll 310 if the partition corresponds to that particular file system format. Thus, the TFAT.dll 310 is not needed for building the initial file, but is shown in FIG. 3 (as a dashed box) as an example of a driver that may be used to access the user partition's data at runtime.

Turning to an explanation of the operation of the present invention and by way of summary, the disk image utility 230 is a desktop utility that takes as inputs a platform memory configuration file 236 (e.g., memory.cfg.xml) and an image manifest file 238 (e.g., platform.sku.xml) and outputs a data file 206 representing the complete ROM image for a device. Because the disk image utility 230 is responsible for relocating module data, one design goal is to be able to share code with a device-side update application.

Among other operations, the disk image utility 230 parses the memory configuration file 236 that defines the memory layout for the device, any reserved regions, and the location and size of one or more flash partitions that contain pre-built BIN/NB0 files (where the NB0 file is a layout of all the .bin files as they should appear in ROM). The disk image utility 230 also parses an image manifest file 238, which declares the package-based partitions and their contents.

In the implementation generally represented in FIG. 3, the disk image utility 230 is capable of constructing various types of partitions, including BINARY, RAMIMAGE, ROMIMAGE, IMGFS, and USERSTORE partitions. BINARY partitions comprise pre-built NB0 files containing arbitrary data, but not packages. As the names suggest, RAMIMAGE partitions are fixed up to RAM, whereas ROMIMAGE partitions are fixed up to execute in place from the NOR part on which they are stored. An image FS partition comprises a partition type that is supported by the disk image utility 230, and can be constructed simply by making calls (via the FSDMGR 304) into a suitable version of IMGFS.dll 308. USERSTORE partitions can be any custom partition type, and are currently used as placeholders in the master boot record 213 for partitions created at boot time.

The following table summarizes the input files and output files from the disk image utility 230:

| Term | Description |
| --- | --- |
| CFG File | The memory configuration file that is input to the disk image utility that specifies hardware and partition information. Also referred to herein as Memory.CFG.XML, which is a required input to the disk image utility. |
| SKU File | The partition mapping file/image manifest file that is input to the disk image utility that specifies package-based partition contents. |
| RAMIMAGE | A binary partition that is fixed up to run from RAM. Can contain packages. |
| ROMIMAGE | A binary partition that is fixed up to run from flash. Can contain packages. |
| IMGFS | A partition type supported by the disk image utility. Can contain packages such as the packages of the system partition. |
| USERSTORE | User-defined partition type. Expected usage is to create an MBR entry for FAT or Extended partitions, but can be any partition type. |
| BINARY | A partition type supported by the disk image utility. Contains arbitrary data. Cannot contain packages. |

The disk image utility 230 is responsible for relocating the modules in any of the package-based partitions. To accomplish this, the disk image utility 230 employs a virtual address (VA) allocator. The disk image utility 230 is also capable of outputting a BIN/NB0 file (as described above) for each flash part of a device that contains the partitions on that part, and a Master Boot Record (MBR). Output files may be created by using the MSPart desktop component. Further, much of the code in the disk image utility 230 (e.g., the VA allocator, IMGFS interactions, module relocations) is also useful to the device-side update application, whereby the disk image utility 230 takes device limitations and code portability into consideration.

Figure 4:
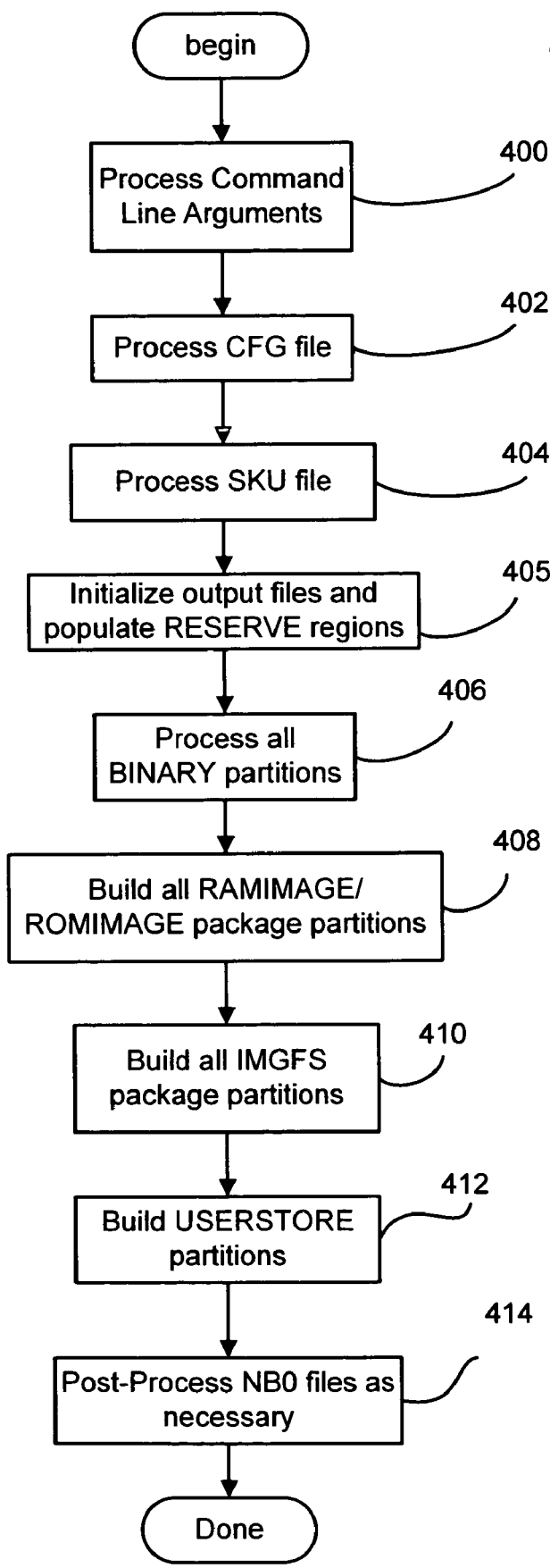
FIG. 4 is a flow diagram representing an overall flow of a disk image utility that configures the output file, in accordance with an aspect of the present invention.

FIG. 4 represents the overall flow of the disk image utility 230. Note that the disk image utility 230 may include a desktop component, and may also include separate components for performing the various operations. For example, the disk image utility may be run via a command line, whereby to process command line arguments as represented by block 400, the disk image utility 230 may include a command line processor. A separate CFG file parser may process the memory configuration file (block 402), and a separate sku/package parser may process the partition mapping (SKU) file as represented by block 404. Components and their functionality are represented in FIG. 4 by a BINARY partition builder/process (block 406), a RAMIMAGE/ROMIMAGE partition builder/process (block 408), an IMGFS partition builder/process (block 410) a USERSTORE partition builder/process (block 412) and a post-processor (block 414). The post processor and data structures used by the disk image utility 230 are described in separate sections below.

As mentioned above, the disk image utility 230 (e.g., dskimage.exe) may be invoked via command line arguments, such as the command:

dskimage CFGfile SKUfile

As should be readily apparent, the CFGfile parameter is the path to the memory configuration file 236, which, as described above, is the input file that details the RAM and flash layout for the current platform, and defines the partitions. The SKU file parameter is the path to the partition mapping/image manifest file 238 which, as described above, lists collections of packages and assigns them to partitions. In one implementations, the disk image utility 230 does not look at file extensions when parsing input files, but when called (e.g., via a script) expects inputs with the following names:

CFGFile=Memory.cfg.xml
SKUFile=%_TGTPLAT%.sku.xml

At present, the command line processor only checks for the existence of the CFGfile and SKUfile command line arguments, and passes them off to their respective (e.g., XSD) validators. If an argument is specified with a relative path, the disk image utility 230 looks for the file relative to the directory from which the disk image utility 230 was invoked. If an argument is specified with an absolute path, the disk image utility 230 looks for the file using the absolute path. In the disk image utility 230, path1 is Environment.CurrentDirectory, and path2 is CFGfile or SKUfile. If the arguments are not present, the command line processor will take appropriate actions, (such as in C# to throw an exception, print a usage message, and exit).

Figure 5:
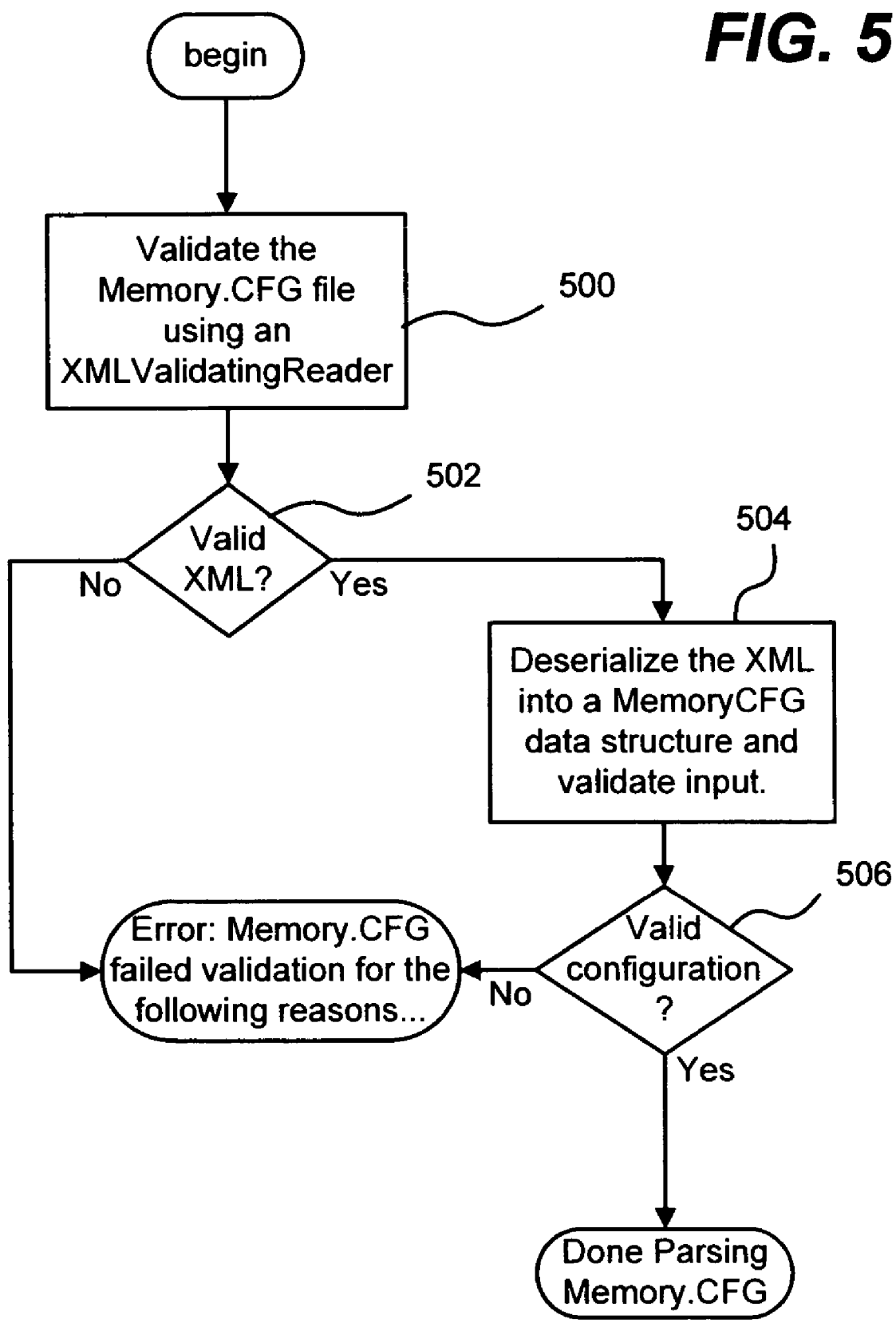
FIG. 5 is a flow diagram representing logic for validating a memory configuration file, in accordance with an aspect of the present invention.

The memory.cfg.xml parser/process was designed to give manufacturers significant flexibility in describing hardware and assigning partitions to flash parts. In one current implementation, the memory configuration parser/process parser (block 402 of FIG. 4) employs two levels of validation on a memory.cfg.xml file, as generally represented in FIG. 5. First, through a C# XMLValidatingReader class, a memory.cfg.xml file is verified for proper syntax; as represented by step 500, a XMLValidatingReader ensures that memory.cfg.xml contains valid XML and the required tags, otherwise step 502 branches to output an error condition. A second level of validation is performed by the disk image utility 230. During second-level validation, an internal representation of RAM, the flash parts, and the partitions is created. XML Serialization is used to create the internal representation, and then validation is performed on this internal structure (as represented in FIG. 5 by steps 504 and 506) to detect invalid configurations, e.g., mapping a partition to a non-existent flash part.

In one example implementation, (e.g., a Windows® CE-based implementation) for a hardware configuration to be valid, the RAM START attribute in the file needs to refer to a valid cached kernel virtual address (0x80000000-0x9FFFFFFF); START+LENGTH also needs to be valid. Any RAM_RESERVE sections need to start and end within the kernel virtual address range specified by the START and LENGTH attributes of the parent RAM element. RAM_RESERVE elements cannot overlap (START to START+LENGTH should be unique for each RAM_RESERVE), and need to have unique, non-empty ID strings.

In this example implementation, various rules may be enforced, including NOR/NAND (collectively referred to as FLASH) need to have unique "ID" attributes and cannot be named "RAM." FLASH RESERVE elements need unique "ID" attributes and cannot have names longer than 8 characters. FLASH element LENGTH attributes need to be evenly divisible by BLOCKSIZE, which in turn need to be evenly divisible by SECTORSIZE. For NOR elements, VASTART need to be block-aligned. FLASH RESERVE element LENGTH attributes need to be evenly divisible by the parent FLASH BLOCKSIZE. For NOR_RESERVE elements, VASTART are block-aligned, and NOR VASTART and VASTART+LENGTH should not overlap with RAM or any other NOR elements and should be valid cached kernel virtual addresses.

Further, to be valid, NOR_RESERVE elements need to start and end within the cached kernel virtual address range specified by the VASTART and LENGTH attributes of the parent NOR element. The HARDWARE conditions can be verified with the use of the Allocator class hierarchy, described below. A global Allocator is created for the valid cached kernel address range, and is used to detect valid addresses for RAM and NOR tags and any collisions between RAM and NOR parts. Similarly, Allocators are created for each RAM and FLASH part to detect valid RESERVE regions. The Allocators may be stored in associated RAM/FLASH objects for easy retrieval.

Partition data is also stored in the MemoryCFG hierarchy. Rules for PARTITIONS validation include that partitions have unique ID attributes, the STORAGE_ID attribute of a PARTITION needs to match the ID attribute of a FLASH part, and the STORAGE_ID attribute of a ROMIMAGE partition cannot refer to NAND flash. For RAMIMAGE/BINARY, the COMPRESS attribute is of type boolean and thus can only be one of the following: {0, 1, true, false}.

RAMIMAGE/ROMIMAGE/IMGFS (collectively referred to as PACKAGE partitions) are also validated, and in a current implementation, there can only be one RAMIMAGE/ROMIMAGE partition. If both are specified, validation will fail. The FSRAMPERCENT and ROMFLAGS attributes correspond to fields in the table of contents of a RAMIMAGE/ROMIMAGE partition (e.g., in a Windows® CE-based implementation). The FIXUP_ADDRESS of a RAMIMAGE partition refers to where the partition should begin in RAM. This attribute needs to point to a valid location in RAM with at least 0x1000 bytes free immediately following it. At present, there cannot be more than one USERSTORE partition per FLASH part.

Figure 6:
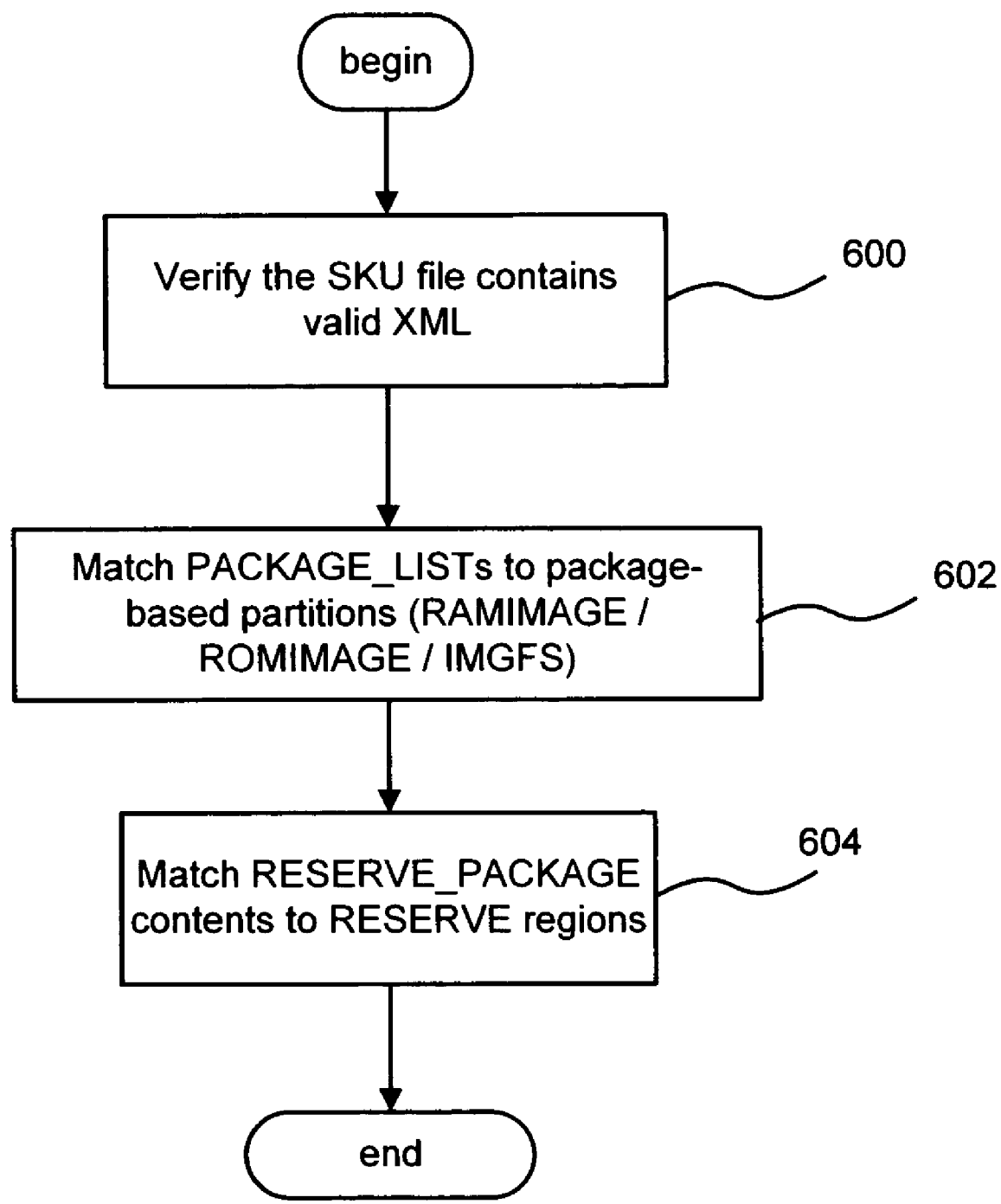
FIG. 6 is a flow diagram representing a process responsible for verifying a package to partition mapping file and for matching specified partitions to packages, in accordance with an aspect of the present invention.

As described above, the image manifest file (package-to-partition mapping or SKU) file 238 contains a list of packages organized by partition. The XML schema (shown above) is relatively straightforward. The image manifest file parser/process is responsible for verifying that the SKU file contains valid XML, as well as for matching the partitions specified in the PACKAGE_LIST tags to PACKAGE partition IDs in memory.cfg.xml. The PARTITION_ID attribute of the PACKAGE_LIST tag needs to match the ID attribute of a PACKAGE partition element in; the SKU parser will throw an exception if it cannot find a match. Steps 600, 602 and 604 of FIG. 6 summarize these various operations.

Each PACKAGE_LIST tag has a required PARTITION_ID attribute. Matching packages to partitions comprises taking the PARTITION_ID attribute and using it as a lookup into a C# HashTable. If a match is found, the child PACKAGE_FILE tags are converted to an ArrayList and merged with the existing package list of the PACKAGE Partition. Extracting the packages can be done in the following manner:

```
/// for each PackagePartiton
/// {
///     create the directory .\DskImage\PartitionID
///     for each Package in the PackagePartition
///     {
///         open the file .\Packages\PackageName
///         error if file not found
///         extract the contents into .\DskImage\PartitionID
///         error if extraction fails
///     }
/// }
```

Note that the disk image utility 230 checks for the existence of the _FLATRELEASEDIR environment variable and uses it as the current working directory if found. This is consistent with the behavior of the traditional build system, which allows a user to execute "makeimg" from any directory, while only manipulating files in _FLATRELEASEDIR.

Figure 7:
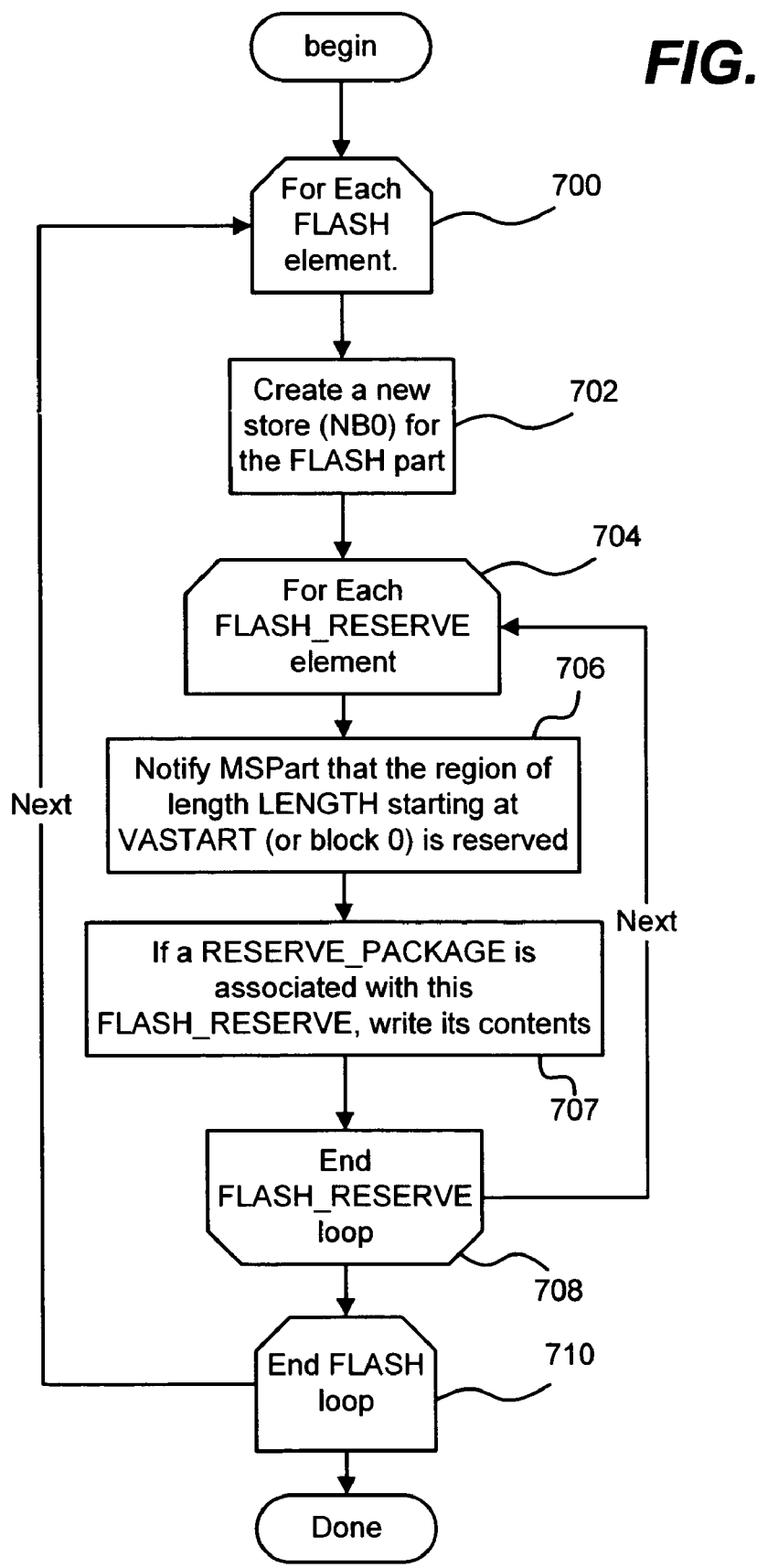
FIG. 7 is a flow diagram representing the processing of flash elements, in accordance with an aspect of the present invention.

Partitions are created and managed by a desktop (build system) version of MSPart, (as in the traditional Windows® CE build system). The MSPart interface allows the disk image utility 230 to abstract details about the underlying hardware from the actual construction of partitions. Any hardware-specific adjustments to the NB0 file created by MSPart are done in post-processing. MSPart may be used by the rest of the disk image utility 230 tool, and if so, before creating any partitions, an MSPart volume is created for each FLASH part, and any RESERVE sections marked off, as described below. The disk image utility 230 maintains a separate class, fsdmgr.cs, which wraps the unmanaged functions that are needed. The process maintains a global HashTable of flash parts so that each may be accessed by name and iterated through. The above process is achieved by iterating over the FlashReserve elements of each Flash part, and making calls into the fsdmgr.dll, as generally represented in FIG. 7. RESERVE regions are populated with data when they are actually created. To this end, the FSDMgr class marshals data from the disk image to fsdmgr_nt.dll to populate the Reserve region.

A first step in building an NB0 is to add the BINARY partitions to an MSPart-mounted Volume. The BINARY partitions are processed first because they are entirely self-contained (i.e. they do not require fixups, nor will they require SectorData metadata on NOR). As generally described above, building BINARY partitions is relatively straightforward; the process iterates through the array of BinaryPartitions and calls their Create( ) methods. Since each Partition object points to its parent flash part, it is also very straightforward to retrieve the proper volume handle.

In one implementation, the PartitionInfo class (part of the MemoryCFG hierarchy) contains a function called CreateAllPartitions, which will start by iterating over the BinaryPartition objects and calling their Create( ) method. The BinaryPartition.Create( ) function creates and mounts a new partition on the specified flash block, opens the file specified in the DATAFILE attribute from memory.cfg.xml, and calls into FSDMgr to write the data to the partition. Pseduocode for this feature is set forth below (using some MSPart APIs):

```
/// create a partition of the maximum size available (error if create fails)
/// open DATAFILE (error if file not found)
/// copy data from DATAFILE to partition (error if run out of space)
/// close partition and DATAFILE
/// query space used and resize partition appropriately
```

As described above, the Disk Image utility provides a "romimage" that is used to create partitions of type ROMIMAGE and RAMIMAGE—partitions that execute in place from ROM and RAM, respectively. These partitions will ordinarily contain a minimal set of system components required to bring up the IMGFS filesystem: nk, coredll, filesys, fsdmgr, mspart, imgfs, and any required block drivers.

Figure 8:
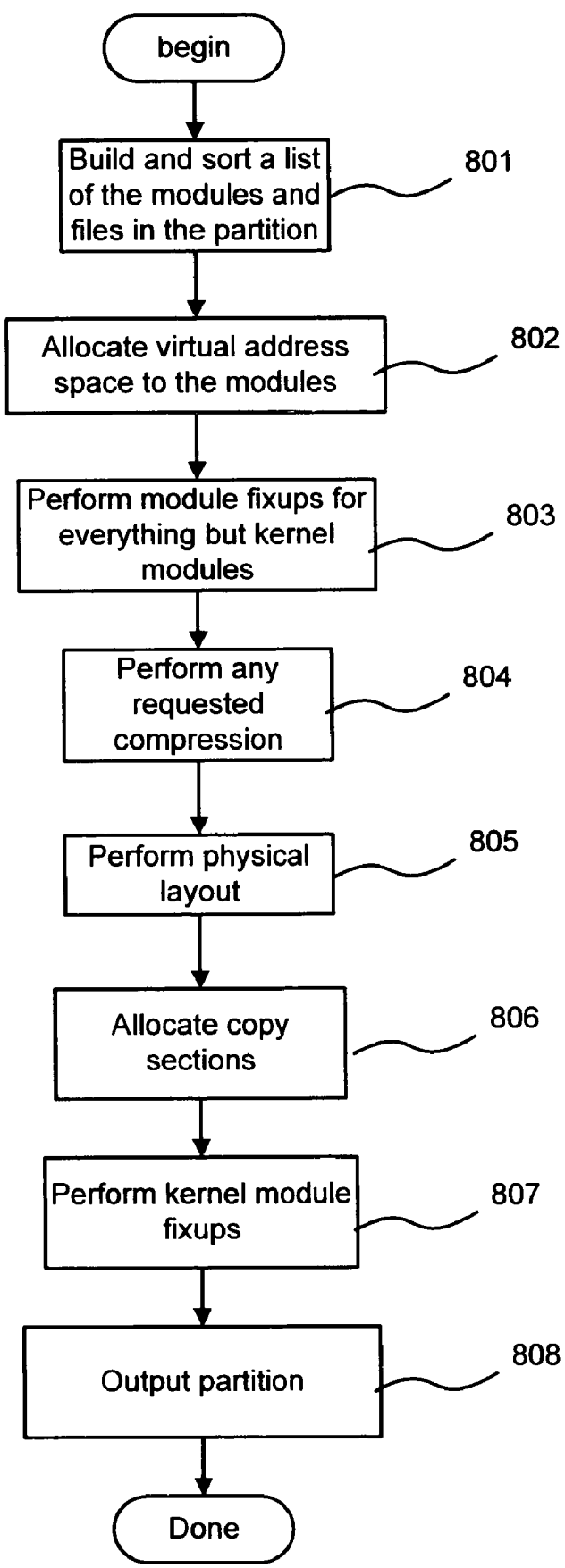
FIG. 8 is a flow diagram representing a process for constructing ROM/RAM-based partitions, in accordance with an aspect of the present invention.

The ROMIMAGE/RAMIMAGE process generally can be broken down into various steps (eight of which are listed in a current implementation, as also represented in steps 801-808 of FIG. 8):

Build and sort a list of modules and files (step 801);
Allocate virtual address space to all modules (step 802);
Perform module fixups (step 803);
Compress all data sections and files (step 804);
Perform physical layout (step 805);
Allocate copy sections (step 806);
Perform kernel module fixups (step 807); and
Output the actual partition (step 808).

Each of the steps above can be performed by making calls into romimage.dll, allowing easy access to allocation and relocation functionality from various (e.g., C and C# applications). The disk image utility may interface with romimage.dll through a wrapper class called ROMImage.cs.

Romimage.dll contains the Allocator class hierarchy and functionality for creating and managing multiple Allocators, the File class hierarchy and functionality for creating and managing lists of files, and functions to perform the steps of the ROMIMAGE/RAMIMAGE partition building process.

The Allocator class hierarchy is used to manage available physical space in RAM and FLASH. It exposes functionality to make both arbitrary allocations and fixed reservations. The Allocator class (and child AllocNode) is defined as follows:

```
class AllocNode
{
  public:
    AllocNode(DWORD s, DWORD 1) { dwStart = s; dwLength = 1;
dwFlags = 0;}
    AllocNode(DWORD s, DWORD 1, DWORD f) { dwStart = s; dwLength =
```

```
-continued
1; dwFlags = f;}
    HANDLE GetHandle( ) { return (HANDLE) this; }
    DWORD GetStart( ) { return dwStart; }
    DWORD GetLength( ) { return dwLength; }
    DWORD GetEnd( ) { return dwStart + dwLength; }
    DWORD GetFlags( ) { return dwFlags; }
    BOOL IsReserveAlloc( ) { return (dwFlags & RESERVE_ALLOC); }
  private:
    DWORD dwStart;
    DWORD dwLength;
    DWORD dwFlags;
};
class Allocator
{
  public:
    Allocator(DWORD s, DWORD l);
    HANDLE GetHandle( ) { return (HANDLE) this; }
    DWORD GetTotalFreeSpace( );
    HRESULT DoReserve(DWORD dwReserveStart, DWORD dwReserveLength,
DWORD dwFlags,
            list<AllocNode>::iterator *pAllocNode, BOOL
fSimulate);
    HRESULT Allocate(DWORD dwLength, DWORD dwAlignment, DWORD
dwFlags,
            list<AllocNode>::iterator *pAllocNode, BOOL
fSimulate);
    HRESULT SetWindowSize(DWORD s, DWORD l, BOOL fIgnoreReserves);
    HRESULT GetMaxFreeNode(list<AllocNode>::iterator *pFreeNode);
    BOOL GetFirstWindowReserve(list<AllocNode>::iterator
*pAllocNode);
    BOOL GetNextWindowReserve(list<AllocNode>::iterator pCurNode,
list<AllocNode>::iterator *pAllocNode);
    void PrintFreeList( );
    DWORD GetStart( ) { return dwStart; }
    DWORD GetLength( ) { return dwLength; }
    DWORD GetEnd( ) { return dwStart + dwLength; }
    DWORD GetWindowStart( ) { return dwWindowStart; }
    DWORD GetWindowLength( ) { return dwWindowLength; }
    DWORD GetWindowEnd( ) { return dwWindowStart + dwWindowLength; }
    DWORD GetFirstWindowAlloc( );
    DWORD GetLastWindowAlloc( );
#ifdef _DEBUG
    list<AllocNode> &GetFreeList( ) { return FreeList; }
    list<AllocNode> &GetAllocList( ) { return AllocList; }
#endif // _DEBUG
  private:
    DWORD dwStart;
    DWORD dwLength;
    DWORD dwWindowStart;
    DWORD dwWindowLength;
    list<AllocNode> FreeList;
    list<AllocNode> AllocList;
    // private functions
    HRESULT TopDownFirstFit(DWORD dwLength, DWORD dwAlignment,
PDWORD pdwAllocStart);
    HRESULT BottomUpFirstFit(DWORD dwLength, DWORD dwAlignment,
PDWORD pdwAllocStart);
    HRESULT BottomUpBestFit(DWORD dwLength, DWORD dwAlignment,
PDWORD pdwAllocStart);
};
```

Romimage.dll exports the following functions for manipulating Allocators:

```
HRESULT CreateAllocator(DWORD dwStart, DWORD dwLength,
PHANDLE phAlloc);
HRESULT DestroyAllocator(HANDLE hAllocator);
HRESULT CanReserveRange(HANDLE hAllocator, DWORD dwStart,
DWORD dwLength);
HRESULT ReserveRange(HANDLE hAllocator, DWORD dwStart,
DWORD dwLength, PHANDLE phNode);
HRESULT SetAllocatorWindow(HANDLE hAllocator, DWORD dwStart,
DWORD dwLength, BOOL fIgnoreReserves);
HRESULT Allocate(HANDLE hAllocator, DWORD dwLength, DWORD
dwAlignment, DWORD dwFlags, PHANDLE phNode);
```

Valid flags for the Allocate function include BOTTOMUP_ALLOC and TOPDOWN_ALLOC. As the names suggest, these are both first-fit algorithms that look for free space starting at the bottom and top of the current allocation window respectively. They require a linear search (and thus may create a performance bottleneck when a large number of allocations are requested).

The File class hierarchy is used to store all metadata about a file or module and is defined as follows:

```
class File
{
public:
    File(wchar_t *FileName, DWORD Attributes);
    ~File( );
    HANDLE GetHandle( ) { return (HANDLE) this; }
    DWORD GetLength( ) { return dwDataLength; }
    DWORD GetFlags( ) { return dwFlags; }
    wstring GetFileName( ) { return szFileName; }
    FILESentry GetFilesEntry( ) { return filesEntry; }
    DWORD GetFileAttributes( );
    virtual HRESULT Load(wchar_t *szFilePath);
    virtual HRESULT DoLayout(Allocator &Alloc, LayoutType ft);
    virtual HRESULT WriteToIMGFS(HVOL hVolume);
    virtual HRESULT WriteToNK(PBYTE pbBuffer, DWORD cbSize, DWORD
dwOffset, PBYTE pbEntryLoc);
    virtual HRESULT DoCompression( );
#ifdef _DEBUG
    virtual HRESULT DumpFile( );
#endif
protected:
    wstring szFileName;
    HANDLE hFileNameAlloc;
    HANDLE hPhysAlloc;
    DWORD dwFlags;
    DWORD dwDataLength;
    BYTE *data;
private:
    CMappedFile *pMappedFile;
    FILESentry filesEntry;
};
class Section
{
public:
    Section( ) { hPhysAlloc = hRAMAlloc = INVALID_HANDLE_VALUE; }
    HANDLE GetHandle( ) { return (HANDLE) this; }
    BOOL IsDataSection( );
    BOOL IsCodeSection( );
    BOOL IsKDATA( );
    // these can be made private...
    o32_rom *o32Header;
    HANDLE hPhysAlloc;
    HANDLE hRAMAlloc;
    DWORD dwDataLength;
    BYTE *data;
};
class FileList;
class Module : public File
{
public:
    Module(wchar_t *FileName, DWORD Attributes);
    ~Module( );
    // virtual functions
    virtual HRESULT Load(wchar_t *szFilePath);
    virtual HRESULT DoLayout(Allocator &Alloc, LayoutType ft);
    virtual HRESULT WriteToIMGFS(HVOL hVolume);
    virtual HRESULT WriteToNK(PBYTE pbBuffer, DWORD cbSize, DWORD
dwOffset, PBYTE pbEntryLoc);
    virtual HRESULT DoCompression( );
    // useful query functions
    BOOL IsKernel( ) { return (szFileName == KernelName); }
    BOOL IsKernelModule( ) { return (dwFlags & TYPEFLAG_K) ? TRUE : FALSE; }
    BOOL IsSlot0Only( ) { return fIsSlot0Only; }
    BOOL IsDLL( ) { return (e32Header->e32_imageflags & IMAGE_FILE_DLL)
? TRUE : FALSE; }
    // get/set
    DWORD GetCopySectionCount( );
    TOCentry GetTocEntry( ) { return tocEntry; }
    void SetSlot0Only(BOOL value) { fIsSlot0Only = value; }
    void SetCrelocPtr(Section *value) { crelocPtr = value; }
    e32_rom *GetE32Ptr( ) { return e32Header; }
    // API functions
    HRESULT DoSplitAlloc(Allocator &Slot0Alloc, Allocator &Slot1Alloc);
    HRESULT DoSlot0OnlyAlloc(Allocator &Slot0Alloc);
    HRESULT DoKernelVAAlloc(Allocator &RAMAlloc, list<COPYentry>
```

-continued
```
    &CopySections);
    HRESULT DoKernelFixups(BOOL fReverse, FileList &ParentList);
    HRESULT DoFixups(BOOL fReverse, FileList &ParentList);
    HRESULT DoFixups(BOOL fReverse, char *szRelFile);
    HRESULT FixupBlob(BYTE *data, DWORD dwDataLen, DWORD dwStartRVA,
BYTE srcSection, BOOL fReverse, FileList &ParentList);
    HRESULT AddSection(PHANDLE phSection);
private:
    e32_rom *e32Header;
    DWORD dwOriginalVBase;
    Section *crelocPtr;
    list<Section> o32Headers;
    BOOL fIsSlot0Only;
    TOCentry tocEntry;
    // allocator handles
    HANDLE hSlot0Alloc;
    HANDLE hSlot1Alloc;
    HANDLE hE32Alloc;
    HANDLE hO32BlockAlloc;
    // private functions
    HRESULT ApplyFixup(WORD wRelocType, PDWORD pdwData, DWORD dwOffset,
WORD wRelocLowAddr);
    HRESULT DoCodeLayout(Allocator &Alloc);
    HRESULT MungeRVAs( );
    HRESULT UnMungeRVAs( );
};
```

On the desktop computer that is building the file, the contents of each file are memory-mapped and pointed to by the data members of the File and Section classes. The following data structure is defined for manipulating the File class hierarchy:

```
class FileList
{
public:
    FileList( );
    HANDLE GetHandle( ) { return (HANDLE) this; }
    HRESULT AddFile(wchar_t *szFileName,
        DWORD dwFlags,
        wchar_t *szPathToFile,
        BOOL fLoadData,
        PHANDLE phFile);
    HRESULT AddModule(wchar_t *szFileName,
        DWORD dwFlags,
        wchar_t *szPathToFile,
        BOOL fLoadData,
        PHANDLE phFile);
    HRESULT DoVAAlloc(Allocator &Slot0Alloc, Allocator
&Slot1Alloc);
    HRESULT DoVAFixups(BOOL fReverse);
    HRESULT DoKernelVAFixups(BOOL fReverse);
    HRESULT DoPhysicalLayout(Allocator &Alloc);
    HRESULT DoCopySectionAlloc(Allocator &Alloc);
    HRESULT DoWriteNKPartition(HVOL hVolume, Allocator &Alloc);
    HRESULT DoWriteIMGFSPartition(HVOL hVolume);
    HRESULT DoParseMiscNKInfo(MiscNKInfo *pData);
    HRESULT DoCompression( );
    BOOL HasKernelModules( ) { return (KernelModules.size( ) > 0); }
    BOOL HasKernel( ) { return
(KernelModules.begin( )->GetFileName( ) == KernelName); }
    // debug spew
    void PrintKernelModules( );
    // get/set
    DWORD GetTOCLoc( ) { return dwTocLoc; }
    void SetTOCExtensions(DWORD dwRomExtLoc) {
pToc.pExtensions = (PVOID) dwRomExtLoc; }
private:
    list<File> Files;
    list<Module> KernelModules;
    list<Module> SplitModules;
    list<Module> Slot0Modules;
    list<COPYentry> CopySections;
```

-continued
```
    HANDLE hCopySectionsAlloc;
    ROMHDR pToc;
    DWORD dwTocLoc;
    HANDLE hTocAlloc;
    DWORD dwSlot1Base;
    BOOL fCompressPartition;
    HANDLE hPrologAlloc;
    // private functions
    HRESULT DoLayout(Allocator &Alloc, LayoutType lt);
    HRESULT WriteROMInfo (HVOL hVolume);
    HRESULT WriteProlog(PBYTE pbBuffer, DWORD cbSize);
    HRESULT WriteCopySections(PBYTE pbBuffer, DWORD cbSize);
    DWORD GetCopySectionCount( );
};
extern list<FileList> FileLists;
```

The following function is provided for building RAMIMAGE/ROMIMAGE partitions:

HRESULT BuildNKPartition(HANDLE hFileList,

HANDLE hvolume,

HANDLE hSlot0Alloc,

HANDLE hSlot1Alloc,

HANDLE hPhysAlloc,

HANDLE hRAMAlloc,

DWORD dwReserved);

wherein:

hFileList is a handle to a FileList object—creation of FileList objects is discussed in the next section;

hVolume is a handle to an MSPart volume, created by DskImage during partition creation;

hSlot0Alloc is a handle to an allocator with start 0x600000, length 0x1A00000;

hSlot1Alloc is a handle to an allocator with start 0x2100000, length 0x1F00000;

hPhysAlloc is the physical allocator (the flash part for ROMIMAGE partitions, RAM for RAMIMAGE partitions);

hRAMAlloc is a RAM allocator, which corresponds to the RAM element in memory.cfg.xml; and dwReserved is a pointer to a MiscNKInfo structure, which is defined as follows:

```
typedef struct _MiscNKInfo
{
    USHORT cbSize;
    USHORT usCPUType;
    DWORD dwROMFlags;
    DWORD dwFSRAMPercent;
    BOOL fCompressPartition;
} MiscNKInfo;
```

To build and sort a list of modules and files, (step 801 of FIG. 8), Romimage.dll manages multiple linked lists of files and modules. To build a list, Romimage.dll provides the following functions:

```
HRESULT CreateFileList(PHANDLE phFileList);
HRESULT DestroyFileList(HANDLE hFileList);
HRESULT AddFileToList(HANDLE hFileList,
    wchar_t *szFileName,
    DWORD dwFlags,
    wchar_t *szpathToFile,
    BOOL fLoadData,
    PHANDLE phFile);
```

There may also be an API to move a File object from one file list to another. Such a function may be in this form:

HRESULT SpliceFile(HANDLE hSrcList,

HANDLE hDstList,

HANDLE hFile);

To allocate virtual address space to the modules, (step 802 of FIG. 8), Slot 0/1 virtual address allocation requires a FileList, an Allocator for Slot 0, and an Allocator for Slot 1. The FileList will already be sorted in the proper order—the internal DoVAAlloc method then needs to perform allocations according to the following logic:

```
/// find the FlieList and Allocators referred to by the handles
      passed to DoVAAlloc
/// error if any of these components is not found
/// for each File in the FileList
/// {
///     is the File the kernel or a kernel module?
///     {
///         save for later - go to next File
///     }
///     is the File a slot 1 DLL?
///     {
///         perform slot 1 code allocation
///         move to slot 0 if allocation fails
///         perform slot 0 data allocation
///         error if allocation fails
///     }
///     is the File a slot 0 DLL?
///     {
///         perform slot 0 code allocation
///         error if allocation fails
///         perform slot 0 data allocation
///         error if allocation fails
///     }
///     is the File simply a File?
///     {
///         do nothing - go to next File
///     }
/// }
```

Module fixups are performed for everything other than kernel modules, as represented by step 803 of FIG. 8. To this end, the following function in the FileList class is provided:

HRESULT DoVAFixups(BOOL fReverse);

The fReverse argument specifies whether a module should be fixed-up or rebased back to its original values. Such functionality is required by the device-side update application, but on the desktop computer building the file, fReverse will always be FALSE (the caller only needs to specify a file list). Note that an earlier romimage.exe iterated through a .rel file and fixed up an entire module at once, however with componentized updates, the capability to only fix up a specified page of a section" is needed. A FixupBlob function in the Module class supports taking an arbitrary pointer to module data and fixes it up by iterating through the creloc section and finding only the fixups that apply to that data. The disk image utility 230 calls it once per module section. The device-side update application will call it after each bindiff page it reconstructs. Note that at this point, the relocation information for a module is stored within the module (in the .creloc section). As a result, for device-side updates there is no longer need to iterate through a relocation file because the needed information is self-contained in the module.

Before physical layout is performed at step 808 of FIG. 8, module data sections are compressed as represented by step 804 of FIG. 8. Note that the disk image utility 230 does not support compression of the code sections of modules because ROMIMAGE and RAMIMAGE partitions are meant to execute in place. If desired, code compression can be easily added, however.

The following function in the FileList class is provided for purposes of compression:

HRESULT DoCompression( );

DoCompression iterates over the specified FileList and compresses the data sections of everything but kernel modules. The psize member of the o32rom header stored in the Section class is updated to reflect the compressed data length. Any suitable compression algorithm will be used, e.g., one current romimage.exe implementation uses an algorithm that is optimized for decompression. Since romimage.dll is used by the device-side update application, however, other algorithms may instead by used.

Once the data sections are compressed, the process has the information needed to perform physical layout. To this end, the following function in the FileList class is provided:

HRESULT DoPhysicalLayout(Allocator &Alloc);

Step 805 of FIG. 8 represents outputting the partitions. For ROMIMAGE partitions, the Allocator of the associated FLASH part is used. The starting position of the partition is determined by querying MSPart. For RAMIMAGE partitions, the RAM Allocator for physical layout is used. The starting position of the partition is determined by the FIXUP_ADDRESS attribute of the partition's RAMIMAGE element.

DoPhysicalLayout uses a first-fit algorithm and iterates through the contents of a FileList in the following order:

1. Code sections (which are page aligned)
2. Data sections (including .creloc and all files)
3. TOC (table of contents, including all TOC entries)
4. All e32 headers
5. All o32 header blocks
6. Copy section block
7. Filenames During this phase, most of the table of contents (TOC) is generated. This is necessary for a place to store the physical location of the module headers. By generating the TOC as the module headers are laid out, the need to create yet another data structure to hold this metadata is avoided.

To Allocate copy sections (step 807 of FIG. 8) and space for kdata, the RAM Allocator is used. Note that this step could be performed earlier for ROMIMAGE partitions, but is not in order to keep the ROMIMAGE and RAMIMAGE processes as similar as possible. Similar to slot 0/1 allocation, one function is provided in the FileList class:

HRESULT DoCopySectionAlloc(Allocator &Alloc);

Once this step is complete, the process can fill in the RAM-Start, RAMFree, and RAMEnd attributes of the pToc.

Once the copy sections have been allocated, the kernel and kernel modules are fixed up, as represented by step 806 of FIG. 8. Similar to slot 0/1 fixups, there is provided the following function in the FileList class:

HRESULT DoKernelVAFixups(BOOL fReverse);

DoKernelVAFixups iterates through the list of kernel modules and perform the necessary fixups by calling the DoKernelFixups method of each Module object.

At this point, everything is fixed up and the physical allocations have been performed. The disk image utility 230 has already communicated with MSPart and has a handle to a partition seeking data. To output the final image, a function for writing partitions is provided:

HRESULT DoWriteNKPartition(HVOL hVolume, Allocator &Alloc);

For RAMIMAGE and ROMIMAGE partitions, DoWriteNKPartition creates a representation of the partition in RAM and then output that block of memory as a single file, similar to the way the disk image utility 230 itself handles BINARY partitions. The Alloc argument is necessary for ROMIMAGE partitions, which require skipping RESERVE regions when writing out.

There are only some relatively small differences between ROMIMAGE and RAMIMAGE partitions, including that physical layout for RAMIMAGE partitions will use the RAM Allocator, whereas physical layout for ROMIMAGE partitions uses the Allocator of the parent flash part. Also, it is possible to fail DoWriteNKPartition for RAMIMAGE partitions, because there may not be enough space on the flash part. Since ROMIMAGE partitions use the Allocator of the parent flash part, DoWriteNKPartition should never fail for ROMIMAGE partitions. Implementation may be in both C and C#, with the managed dskimage.exe making calls into the unmanaged romimage.dll.

The disk image utility 230 is responsible for iterating through the manifest (DSM) files in _FLATRELEASEDIR\DskImage\Partition and adding the DSM file entries (and the DSM file itself) into a FileList for romimage.dll to process. For ROMIMAGE partitions, the disk image utility 230 calls into MSPart to create a new partition before attempting physical layout; (for RAMIMAGE, it can create the partition at any time). After the partition is output, the disk image utility 230 resizes it, as described above. Other operations are handled by romimage.dll.

As described above, another package partition type that is built is IMGFS. This is built after the others for a number of reasons, including that allocation for RAMIMAGE/ROMIMAGE regions needs to occur first because of restrictions imposed by the Windows CE kernel, and IMGFS partitions require SectorInfo on NOR. The sample NOR Flash Media Driver assumes that flash is organized such that partitions that contain SectorInfo come after those without SectorInfo. The steps in building an IMGFS partition are similar to those for ROMIMAGE/RAMIMAGE partitions. The following steps are essentially recycled from the ROMIMAGE/RAMIMAGE partition builder:

Build and sort a list of modules and files;
Allocate virtual address space to all modules;
Perform module fixups; and
Output the actual partition.

Physical layout for IMGFS is handled by IMGFS and MSPart. Similar to RAMIMAGE/ROMIMAGE partitions, there exists a BuildIMGFSPartition API for writing IMGFS partitions:

```
HRESULT BuildIMGFSPartition(
    HANDLE hFileList,
    HANDLE hVolume,
    HANDLE hSlot0Alloc,
    HANDLE hSlot1Alloc,
    DWORD dwReserved);
```

It is expected that the Slot 0 and Slot 1 allocators specified will be the same ones used earlier to build a RAMIMAGE/ROMIMAGE partition.

IMGFS is responsible for compression. By default, Files and Module data sections are compressed.

Note that an IMGFS partition cannot contain kernel modules (modules that have the K flag in ce.bib). Thus, before performing VA allocation, BuildIMGFSPartition verifies that the specified FileList does not contain any kernel modules.

Next, the following FileList member functions are called:
1. DoVAAlloc
2. DoVAFixups
3. DoWriteIMGFSPartition (FIG. 9)

Figure 9:
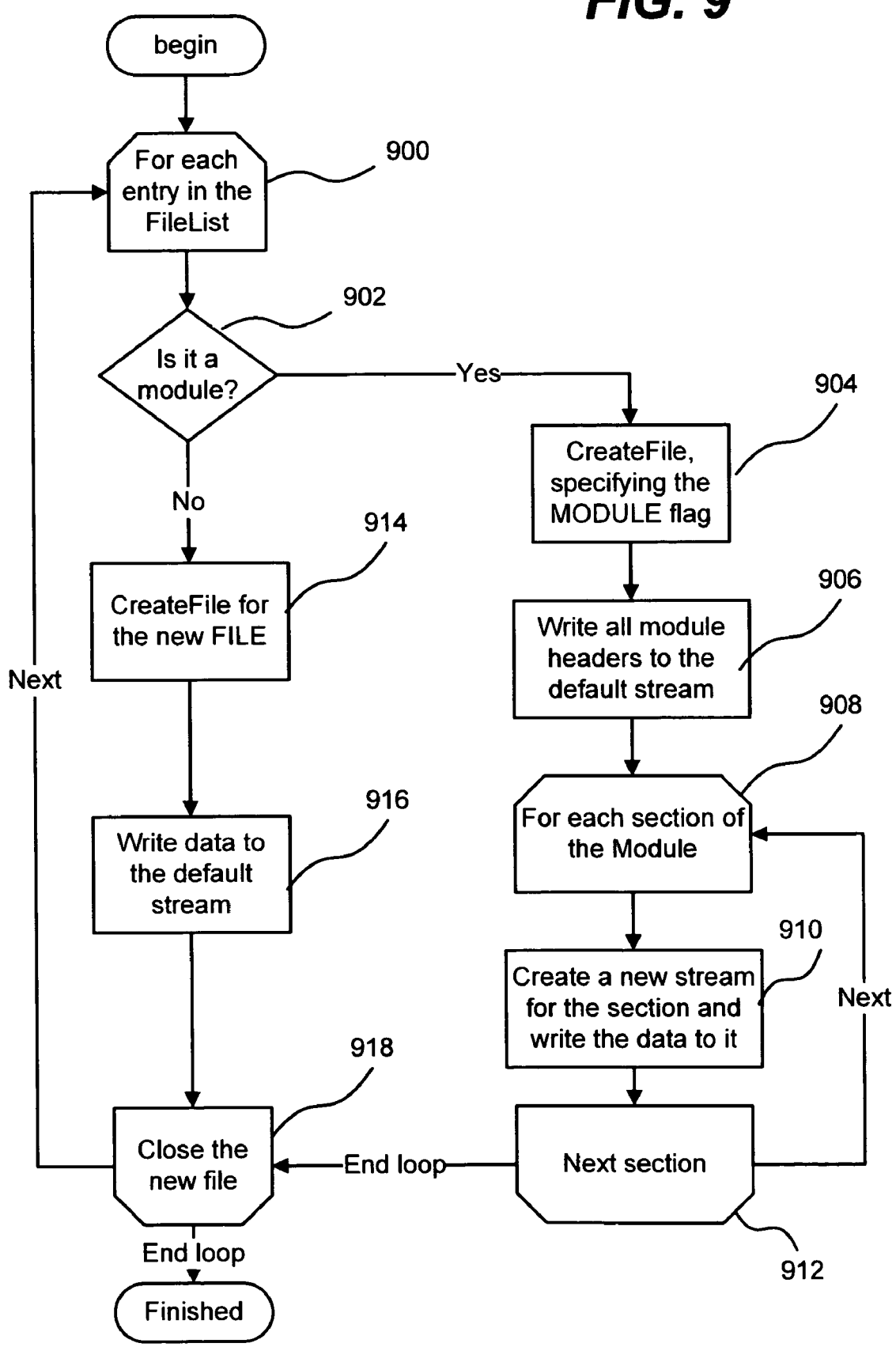
FIG. 9 is a flow diagram representing a process for writing a system partition, in accordance with an aspect of the present invention.

As generally represented in FIG. 9, after performing module fixups, the process iterates (steps 900 and 918) through the specified FileList, creating a new file in IMGFS for each entry. Note that if the current list item is a Module (step 902), it is processed section by section (steps 904 to 912). Otherwise the file is created (step 914) and the data is written (step 916).

Another partition type is built is USERSTORE, essentially any type of filesystem desired by the user. It is ideally designed for FAT or Extended partitions (PART_TYPEs 0x04 and 0x05). Because in one current implementation, memory-cfg.xsd does not allow users to specify a length for a USER-STORE, this partition spans the remaining flash. To build a USERSTORE, the process calls into FSDMGR to create a partition of the specified PART_TYPE, and instructs FSD-MGR to use the remaining space on the flash part, that is, by specifying that it should be auto-sized (whereby in one implementation, there is a limit of one USERSTORE per flash part).

Post-Processing

In accordance with an aspect of the present invention, when completed, the disk image utility has generated the single file 206 on the build (e.g., desktop) system, which contains the one or more partitions corresponding to different file systems. Within those partitions, the contents of the packages will be installed, with executable modules fixed-up in the virtual address space, as appropriate. Note that at this point, the user has only indicated certain specifics of the hardware, namely the RAM and storage locations (addresses), their sizes, and whether the storage is linear or block-based. Not yet specified are the specifics of whether the flash is NOR flash or NAND flash, or a hard disk drive or some other type of storage. The storage technology may have an impact on the image, depending on how it is managed.

Figure 10A:
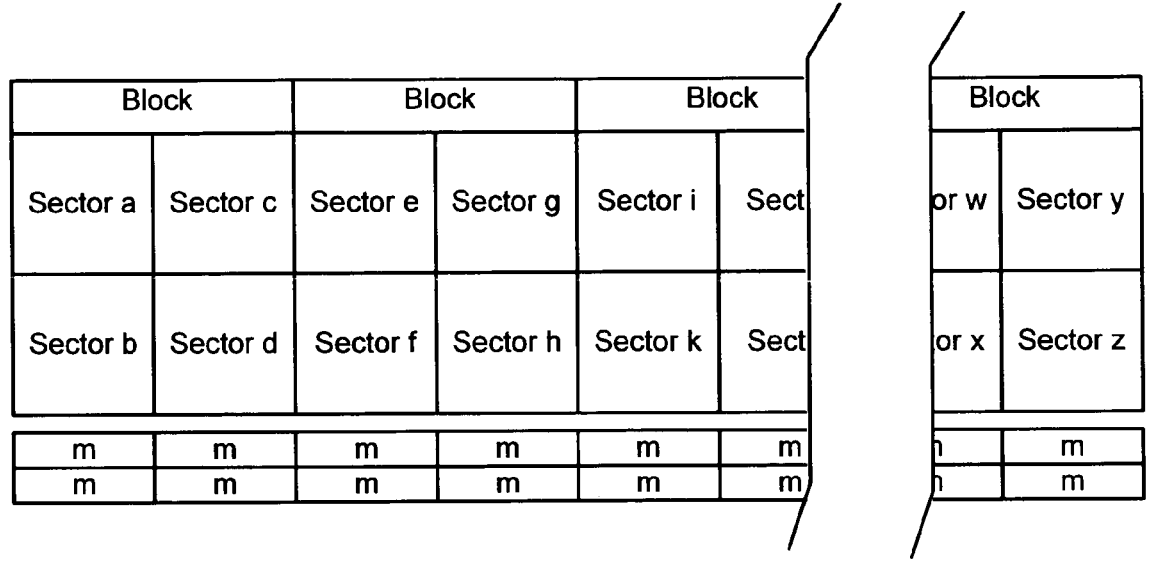
FIGS. 10A and 10B are block diagrams representing different ways that sectors and blocks are arranged in flash memory, as handled by post-processing in accordance with an aspect of the present invention.
Figure 10B:
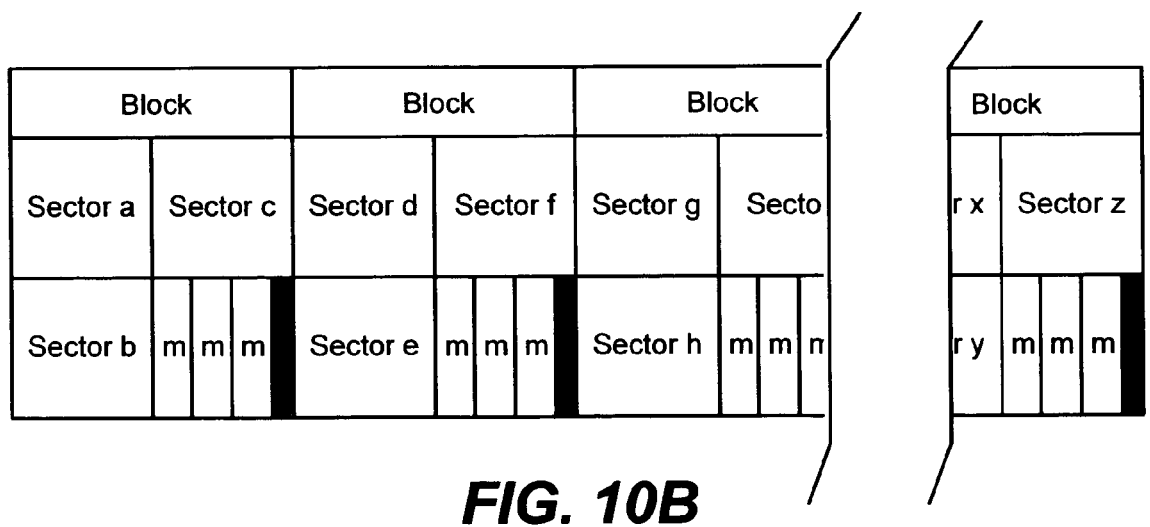

For example, flash storage is normally divided into blocks and further subdivided into pages or sectors, as generally represented in FIGS. 10A and 10B. The sizes of each of these sub-components and the manner in which the storage technology identifies each (e.g., numerically) and the manner in which bad/reserved/read-only status for each page or sector are managed is storage-technology specific.

A purpose of the post-processing step is to introduce this management information into the image in such a way that it does not violate the requirements of the image layout, as specified in the input files to the disk image utility. For example, if one of the partitions is to execute out of NOR flash, then there are CPU requirements specifying that it be map able to the CPU in CPU page increments and this can not be changed due to storage management requirements.

The post-processing phase of the disk image utility 230 tool is used to make storage hardware-specific adjustments to the MSPart-generated NB0 files. For example, as represented in FIG. 10A, NAND flash has sector information (metadata m for each sector) accompanying that sector in a separate space. However, NOR hardware will need to modify the IMGFS partition to include SectorInfo within the block for each sector, as generally represented in FIG. 10B by the metadata (m) for three sectors of a four-sector block being maintained in the remaining sector of each block. Note that to block align, some space may not be used, as represented by the shaded areas in FIG. 10B. Device manufactures with paired flash may also wish to separate the NB0 into separate files for each flash part.

A postprocessor 232 (FIG. 2, e.g., postproc.exe) may be automatically executed by the disk image utility 230 on any NOR flash elements in memory.cfg.xml. Given the ID, VASTART, BLOCKSIZE, and SECTORSIZE attributes of a NOR element, the postprocessor outputs ID.nb0.postproc and ID.bin. To further postprocess the disk image utility 230 output, the user (e.g., an OEM) may create a postdiskimage-.bat file, which will be called by the buildpkg script when the disk image utility 230 process is complete.

In operation, the postprocessor 232 opens an NB0 and finds the master boot record, and uses the data therein to locate the IMGFS partition. The postprocessor 232 then adds sector data to each sector in a format that the (e.g., NOR) block driver will understand. The postprocessor 232 also moves the beginning of the USERSTORE, if it exists, because it may no longer correspond to the beginning of a flash block after sector data is added to IMGFS, and saves the modified NB0. The postprocessor 232 may further converts the modified NB0 into a binary file for legacy bootloaders.

As can be seen from the foregoing detailed description, there is provided a mechanism that converts operating system image components into a file system-based manufacturing image. The image file is independent of any particular storage technology, and is suitable for use as an initial image, while facilitating componentized updating of the device.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method of creating a file system within a file in a storage technology abstracted manner so that that file system can be easily applied to varying storage technologies, the method comprising:
   accessing packages containing image data to install to a first storage medium, wherein at least some of the packages are operating system image components, and wherein the packages include an update loader component, a kernel component, an operating system files component, and a user data component;
   accessing a description of partitions to which the package contents are to be written, the description of the partitions comprising information correlating each package to a particular partition, wherein the description of partitions comprises an Extensible Markup Language (XML) file; and
   based on the accessed packages and the description of the partitions, generating an output file to a second storage medium, the output file being an image file and containing a plurality of partitions wherein each partition corresponds to a file system, but not implementing file system logic for a particular storage technology, with the contents of each package stored in one of the plurality of partitions based on the description of the partitions, and wherein the output file comprises:
     a first partition, wherein the first partition comprises binary code implementing an update loader;
     a second partition, the second partition being a kernel partition, and storing at least one of a random access memory (RAM) image or a read only memory (ROM) image;
     a third partition, the third partition being a system partition and comprising operating system files;
     a fourth partition, the fourth partition being a user partition specified for user data storage.

2. The method of claim 1 further comprising, accessing a memory configuration file to determine a lay out of the plurality of partitions to be laid out within the output file.

3. The method of claim 1 wherein the second partition comprises a RAM-based image partition, and wherein the RAM-based image partition is located to a unique virtual address range through a fix-up or relocation process based on known address information and known restrictions as to where subsections of an executable file can be placed in the overall virtual address space, to process each executable file and locate the contents at a non-overlapping virtual address space range.

4. The method of claim 1 wherein the second partition comprises a ROM-based image partition, and wherein the ROM-based image partition is has code fixed-up or relocated to execute-in-place on the first storage medium.

5. The method of claim 1 wherein generating the output file comprises writing data to a partition that extends to the end of the file, and adjusting the size of the partition based on the actual amount of data written.

6. The method of claim 5 wherein writing data to a master boot record comprises defining a user store partition.

7. The method of claim 1 wherein generating the output file comprises writing data to the third partition that extends to the end of the file, adding a free space buffer after the end of the data written, and adjusting the size of the third partition based on the actual amount of data written and the free space buffer to enable future updates to the third partition to consume more space than consumed by the data in the current third partition, allowing for growth of subsequent updates.

8. The method of claim 1 further comprising, writing data to a master boot record in the file to define the plurality of partitions contained in the file.

9. The method of claim 1 further comprising, writing additional data to the output file.

10. The method of claim 1 further comprising, executing a post-process to prepare for transferring data from the output file into the first storage medium.

11. The method of claim 10 wherein the first storage medium comprises flash memory in which code therein can be executed in place, and further comprising, accessing a memory configuration file to fix up at least one of the plurality of partitions such that code contained therein will execute in place.

12. The method of claim 1 further comprising, accessing a memory configuration file to determine which sections of the first storage medium are reserved.

13. One or more computer-readable storage media storing computer-executable instructions which when executed perform the method of claim 1.

14. In a computing environment, a method of generating an image for installation to a storage medium of a computing device, the image being generated from a file storing a plurality of partitions in a storage technology abstracted manner allowing the file to be easily applied to variety of storage technologies, the method comprising:
    accessing the file that contains a plurality of partitions, wherein the plurality of partitions contained in the file are stored in a storage technology abstracted manner without reference to any particular storage technology, and not implementing file system logic for a particular storage technology, and wherein a description of the file that contains the plurality of partitions is an Extensible Markup Language (XML) file, and wherein each partition contains image data to install to a storage medium and wherein each partition corresponds to a file system, the file comprising:
        a first partition, wherein the first partition comprises binary code implementing an update loader;
        a second partition, the second partition being a kernel partition, and storing at least one of a RAM image or a ROM image;
        a third partition, the third partition being a system partition and comprising operating system files;
        a fourth partition, the fourth partition being a user partition specified for user data storage; and
    processing the file to introduce any modifications to the plurality of partitions and file system layout as required to convert the plurality of partitions and file system layout from a storage technology abstracted manner to a specific storage technology.

15. The method of claim 14 further comprising, transferring data from the file into the storage medium corresponding to the specific storage technology.

16. One or more computer-readable storage media storing computer-executable instructions which when executed perform the method of claim 15.

17. The method of claim 14 further comprising, accessing a memory configuration file to determine a location of at least one of the partitions within the output file.

18. The method of claim 14 wherein the image data corresponds to packages, and further comprising, generating the file from a partition-to-package mapping file and a memory configuration file.

19. In a computing environment, a computer program product comprising computer readable storage media having stored thereon components for creating a storage technology abstracted file containing partitions corresponding to file systems and for processing the storage technology abstracted file to generate a storage technology specific image file, the components comprising:
    a disk image utility process that inputs a partition-to-package mapping file containing partition information and package information, and based on the data in the partition-to-package mapping file, wherein the partition-to-package mapping is an Extensible Markup Language (XML) file outputs an image file using packages identified in the package information, wherein at least some of the packages are operating system image components, and wherein the packages include an update loader component, a kernel component, an operating system files component, and a user data component, the image file comprising a plurality of partitions identified in the partition information, wherein each of the plurality of partitions corresponds to a distinct file system, with the contents of each package stored in one of the partitions based on the description, wherein the data contained in the output image file is maintained in a storage technology abstracted manner, without implementing file system logic for a particular storage technology, so that there is no dependence on any particular storage technology and wherein the output file comprises:
        a first partition, wherein the first partition comprises binary code implementing an update loader;
        a second partition, the second partition being a kernel partition, and storing at least one of a RAM image or a ROM image;
        a third partition, the third partition being a system partition and comprising operating system files;
        a fourth partition, the fourth partition being a user partition specified for user data storage; and
    a post-process that processes the image file to introduce any modifications to the image as required by a specific storage technology thereby resulting in a storage technology specific image file.

20. The computer program product of claim 19 wherein the disk image utility process further inputs a memory configuration file containing data indicative of how storage for a device is configured.

21. The computer program product of claim 20 wherein the device is configured with memory in which code therein can be executed in place, and wherein the memory configuration file is accessed to fix up at least one of the partitions such that code therein will execute in place.

22. The computer program product of claim 20 wherein the memory configuration file is accessed to determine which sections of device memory are reserved.

23. The computer program product of claim 19 wherein the contents of at least one package corresponds to an operating system component, wherein one of the partitions comprises a system partition, and wherein the disk image utility writes the operating system component to the system partition based on the description.

24. The computer program product of claim 19 wherein the disk image utility writes data to a partition that extends to the end of the file, and adjusts the size of the partition based on the actual amount of data written.

25. The computer program product of claim 19 wherein the disk image utility writes data to the third partition that extends to the end of the file, adding a free space buffer after the end of the data written, and adjusts the size of the third partition based on the actual amount of data written and the free space buffer to enable future updates to the third partition to consume more space than consumed by the data in the current third partition, allowing for growth of subsequent updates.

26. The computer program product of claim 19 wherein the disk image utility writes data to a master boot record in the file to define a partition.

27. The computer program product of claim 26 wherein the disk image utility defines a user store partition by writing data to the master boot record.

* * * * *